(12) United States Patent
Vanaraj et al.

(10) Patent No.: US 9,652,175 B2
(45) Date of Patent: May 16, 2017

(54) LOCALLY GENERATING AND STORING RAID STRIPE PARITY WITH SINGLE RELATIVE MEMORY ADDRESS FOR STORING DATA SEGMENTS AND PARITY IN MULTIPLE NON-VOLATILE MEMORY PORTIONS

(71) Applicant: SanDisk Enterprise IP LLC, Milpitas, CA (US)

(72) Inventors: Anantharaj Thalaimalai Vanaraj, Rajapalayam (IN); Sainath Viswasarai, Hyderbad (IN); Aaron K. Olbrich, Morgan Hill, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/728,988

(22) Filed: Jun. 2, 2015

(65) Prior Publication Data

US 2016/0299699 A1 Oct. 13, 2016

Related U.S. Application Data

(60) Provisional application No. 62/145,434, filed on Apr. 9, 2015.

(51) Int. Cl.
*G06F 13/00* (2006.01)
*G06F 3/06* (2006.01)
*G06F 11/10* (2006.01)

(52) U.S. Cl.
CPC .......... *G06F 3/0656* (2013.01); *G06F 3/0604* (2013.01); *G06F 3/065* (2013.01);
(Continued)

(58) Field of Classification Search
CPC .... G06F 3/061; G06F 3/0659; G06F 11/1076; G06F 2212/262; G06F 3/0611;
(Continued)

(56) References Cited

U.S. PATENT DOCUMENTS 4,586,167 A 4/1986 Fujishima et al.
5,559,988 A 9/1996 Durante et al.
(Continued)

FOREIGN PATENT DOCUMENTS

EP 0 376 285 A2 7/1990
WO WO 2012/083308 6/2012

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

(Continued)

*Primary Examiner* — Hong Kim
(74) *Attorney, Agent, or Firm* — Morgan, Lewis & Bockius LLP

(57) ABSTRACT

A memory controller receives a command to perform a memory operation, the command including a data packet comprising a plurality of data divisions. In response to receiving the command, for each individual memory device, the memory controller assigns to the individual memory device a respective data division, the respective data division including a plurality of data segments, and determines a single relative memory address associated with an address specified by the received command. The memory controller assembles a sub-request comprising a single contiguous instruction portion, which includes the single relative memory address and one or more instructions to perform the memory operation, and the respective data division, the respective data division following the single contiguous instruction portion, and transmits the sub-request to every memory portion of the number of memory portions of the individual memory device.

20 Claims, 18 Drawing Sheets

(52) U.S. Cl.
CPC .......... *G06F 3/0611* (2013.01); *G06F 3/0616* (2013.01); *G06F 3/0619* (2013.01); *G06F 3/0631* (2013.01); *G06F 3/0638* (2013.01); *G06F 3/0659* (2013.01); *G06F 3/0679* (2013.01); *G06F 3/0688* (2013.01); *G06F 11/1076* (2013.01)

(58) Field of Classification Search
CPC .... G06F 3/0688; G06F 3/0619; G06F 3/0656; G06F 3/0631; G06F 3/0616; G06F 3/065; G06F 3/0638; G06F 3/0604; G06F 3/0679
USPC .......................... 711/114; 714/6.22; 710/21
See application file for complete search history.

(56) References Cited

U.S. PATENT DOCUMENTS

| | | | |
|---|---|---|---|
| 5,909,559 | A | 6/1999 | So |
| 6,247,136 | B1 | 6/2001 | MacWilliams et al. |
| 6,292,410 | B1 | 9/2001 | Yi et al. |
| 6,401,213 | B1 | 6/2002 | Jeddeloh |
| 6,449,709 | B1 | 9/2002 | Gates |
| 8,010,738 | B1 | 8/2011 | Chilton et al. |
| 8,122,202 | B2 | 2/2012 | Gillingham |
| 8,213,255 | B2 | 7/2012 | Hemink et al. |
| 8,255,618 | B1 | 8/2012 | Borchers et al. |
| 8,321,627 | B1 | 11/2012 | Norrie et al. |
| 8,429,498 | B1 | 4/2013 | Anholt et al. |
| 8,479,080 | B1 | 7/2013 | Shalvi et al. |
| 8,539,139 | B1 | 9/2013 | Morris |
| 8,595,590 | B1 | 11/2013 | Vojcic et al. |
| 8,825,967 | B2 | 9/2014 | Hong Beom |
| 8,874,836 | B1 | 10/2014 | Hayes et al. |
| 8,886,872 | B1 | 11/2014 | Norrie |
| 8,924,661 | B1 | 12/2014 | Shachar et al. |
| 8,984,376 | B1 | 3/2015 | Norrie |
| 9,128,825 | B1 | 9/2015 | Albrecht et al. |
| 9,170,876 | B1 | 10/2015 | Bates et al. |
| 9,176,971 | B2 | 11/2015 | Shapiro |
| 2003/0115403 | A1 | 6/2003 | Bouchard et al. |
| 2003/0122834 | A1 | 7/2003 | Mastronarde et al. |
| 2004/0117441 | A1 | 6/2004 | Liu et al. |
| 2005/0144361 | A1 | 6/2005 | Gonzalez et al. |
| 2005/0248992 | A1 | 11/2005 | Hwang et al. |
| 2007/0002629 | A1 | 1/2007 | Lee et al. |
| 2007/0233937 | A1 | 10/2007 | Coulson et al. |
| 2008/0140914 | A1 | 6/2008 | Jeon |
| 2008/0147994 | A1 | 6/2008 | Jeong et al. |
| 2008/0295094 | A1 | 11/2008 | Korupolu et al. |
| 2009/0168525 | A1 | 7/2009 | Olbrich et al. |
| 2009/0177943 | A1 | 7/2009 | Silvus et al. |
| 2009/0222627 | A1 | 9/2009 | Reid |
| 2009/0282191 | A1* | 11/2009 | Depta ................. G06F 3/061 711/113 |
| 2010/0005217 | A1 | 1/2010 | Jeddeloh |
| 2010/0014364 | A1 | 1/2010 | Laberge et al. |
| 2010/0082879 | A1 | 4/2010 | Mckean et al. |
| 2010/0165730 | A1 | 7/2010 | Sommer et al. |
| 2010/0174845 | A1 | 7/2010 | Gorobets et al. |
| 2010/0174853 | A1 | 7/2010 | Lee et al. |
| 2010/0220509 | A1 | 9/2010 | Sokolov et al. |
| 2010/0250874 | A1 | 9/2010 | Farrell et al. |
| 2011/0113204 | A1 | 5/2011 | Henriksson et al. |
| 2011/0138100 | A1 | 6/2011 | Sinclair |
| 2011/0235434 | A1 | 9/2011 | Byom et al. |
| 2011/0252215 | A1 | 10/2011 | Franceschini et al. |
| 2011/0264851 | A1 | 10/2011 | Jeon et al. |
| 2011/0302474 | A1 | 12/2011 | Goss et al. |
| 2012/0030408 | A1 | 2/2012 | Flynn et al. |
| 2012/0047317 | A1 | 2/2012 | Yoon et al. |
| 2012/0159070 | A1* | 6/2012 | Baderdinni ......... G06F 12/0871 711/114 |
| 2012/0198129 | A1 | 8/2012 | Van Aken et al. |
| 2012/0224425 | A1 | 9/2012 | Fai et al. |
| 2012/0278530 | A1 | 11/2012 | Ebsen |
| 2012/0324180 | A1 | 12/2012 | Asnaashari et al. |
| 2013/0007380 | A1 | 1/2013 | Seekins et al. |
| 2013/0070507 | A1 | 3/2013 | Yoon |
| 2013/0111112 | A1 | 5/2013 | Jeong et al. |
| 2013/0111289 | A1 | 5/2013 | Zhang et al. |
| 2013/0111290 | A1 | 5/2013 | Zhang et al. |
| 2013/0132650 | A1 | 5/2013 | Choi et al. |
| 2013/0182506 | A1 | 7/2013 | Melik-Martirosian |
| 2013/0219106 | A1 | 8/2013 | Vogan et al. |
| 2013/0232290 | A1 | 9/2013 | Ish et al. |
| 2013/0254498 | A1 | 9/2013 | Adachi et al. |
| 2013/0262745 | A1 | 10/2013 | Lin et al. |
| 2013/0297894 | A1 | 11/2013 | Cohen et al. |
| 2013/0346805 | A1 | 12/2013 | Sprouse et al. |
| 2014/0006688 | A1 | 1/2014 | Yu et al. |
| 2014/0013026 | A1 | 1/2014 | Jannyavula Venkata et al. |
| 2014/0047170 | A1 | 2/2014 | Cohen et al. |
| 2014/0075100 | A1 | 3/2014 | Kaneko et al. |
| 2014/0143637 | A1 | 5/2014 | Cohen et al. |
| 2014/0173239 | A1 | 6/2014 | Schushan |
| 2014/0229655 | A1 | 8/2014 | Goss et al. |
| 2014/0229656 | A1 | 8/2014 | Goss et al. |
| 2014/0241071 | A1 | 8/2014 | Goss et al. |
| 2014/0244897 | A1 | 8/2014 | Goss et al. |
| 2014/0258598 | A1* | 9/2014 | Canepa ................. G06F 3/0683 711/103 |
| 2014/0281833 | A1 | 9/2014 | Kroeger et al. |
| 2014/0310241 | A1 | 10/2014 | Goyen |
| 2014/0379988 | A1 | 12/2014 | Lyakhovitskiy et al. |
| 2015/0067172 | A1 | 3/2015 | Ashokan et al. |
| 2015/0074487 | A1 | 3/2015 | Patapoutian et al. |
| 2015/0095558 | A1 | 4/2015 | Kim et al. |
| 2015/0186278 | A1 | 7/2015 | Jayakumar et al. |
| 2015/0234612 | A1 | 8/2015 | Himelstein et al. |
| 2015/0261473 | A1 | 9/2015 | Matsuyama et al. |
| 2015/0262632 | A1 | 9/2015 | Shelton et al. |
| 2015/0301749 | A1* | 10/2015 | Seo ..................... G06F 3/0611 714/6.24 |
| 2015/0331627 | A1 | 11/2015 | Kwak |
| 2016/0026386 | A1* | 1/2016 | Ellis ..................... G06F 3/061 711/103 |
| 2016/0034194 | A1 | 2/2016 | Brokhman et al. |
| 2016/0062699 | A1 | 3/2016 | Samuels et al. |
| 2016/0070493 | A1 | 3/2016 | Oh et al. |
| 2016/0071612 | A1 | 3/2016 | Takizawa et al. |
| 2016/0117099 | A1* | 4/2016 | Prins .................. G06F 11/1441 711/103 |
| 2016/0117102 | A1 | 4/2016 | Hong et al. |
| 2016/0117105 | A1 | 4/2016 | Thangaraj et al. |
| 2016/0117252 | A1* | 4/2016 | Thangaraj .......... G06F 12/0246 711/118 |
| 2016/0170671 | A1 | 6/2016 | Huang |
| 2016/0170831 | A1 | 6/2016 | Lesartre et al. |
| 2016/0179403 | A1 | 6/2016 | Kurotsuchi et al. |
| 2016/0299689 | A1 | 10/2016 | Kim et al. |
| 2016/0299699 | A1* | 10/2016 | Vanaraj ................. G06F 3/0656 |
| 2016/0299704 | A1* | 10/2016 | Vanaraj ................. G06F 3/0656 |
| 2016/0299724 | A1* | 10/2016 | Vanaraj ................. G06F 3/0656 |
| 2016/0342344 | A1 | 11/2016 | Kankani et al. |
| 2016/0342345 | A1 | 11/2016 | Kankani et al. |
| 2016/0371394 | A1 | 12/2016 | Shahidi et al. |

OTHER PUBLICATIONS

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

(56) References Cited

OTHER PUBLICATIONS

Atmel Data-sheet, "9-to-bit Selectable, ±0.5°C Accurate Digital Temperature Sensor with Nonvolatile Registers and Serial EEPROM" www.atmel.com/images/Atmel-8854-DTS-AT3OTSE752A-754A-758A-Datasheet.pdf, Atmel Data-sheet, Mar 1, 2011,—Atmel-8854-DTS-AT3OTSE752A-754A-758A-Datasheet_102014, 57 pages.
Seagate Technology, "SCSI Commands Reference Manual, Rev. C", Product Manual dated Apr. 2010, pp. 211-214.
Tanenbaum, "Structured Computer Organization", 3rd edition 1990, section 1.4, p. 11, 3 pages.
International Search Report and Written Opinion dated Jul. 4, 2016, received in International Patent Application No. PCT/US2016/028477, which corresponds to U.S. Appl. No. 14/883,540, 11 pages. (Hodgdon).
International Search Report and Written Opinion dated Sep. 8, 2016, received in International Patent Application No. PCT/US2016/036716, which corresponds to U.S. Appl. No. 14/925.945, 13 pages. (Ellis).

\* cited by examiner

D = D1 + D2 + D3 + D4

LOCALLY GENERATING AND STORING RAID STRIPE PARITY WITH SINGLE RELATIVE MEMORY ADDRESS FOR STORING DATA SEGMENTS AND PARITY IN MULTIPLE NON-VOLATILE MEMORY PORTIONS

RELATED APPLICATIONS

This application claims priority to U.S. Provisional Patent Application No. 62/145,434, "Method and System for Multi-Package Segmented Data Transfer Protocol for SSD Applications," filed Apr. 9, 2015, which is hereby incorporated by reference in its entirety.

This application is related to U.S. patent application Ser. No. 14/728,984, filed Jun. 2, 2015, which is hereby incorporated by reference in its entirety.

This application is related to U.S. patent application Ser. No. 14/728,992, filed Jun. 2, 2015, which is hereby incorporated by reference in its entirety.

TECHNICAL FIELD

The disclosed embodiments relate generally to memory systems, and in particular, to reducing the time taken to perform memory operations across multiple memory devices in parallel.

BACKGROUND

Storage needs for today's computing world are increasing at a rapid pace, particularly as many applications rely on cloud computing resources. Along with increased storage capacity, there is a great need to access storage resources quickly, and reliably. For example, solid-state drives used in enterprise storage applications must be able to provide a relatively high number of I/O operations per second (IOPS), as data transfers to and from the drives become larger.

Data striping is a well-known technique for spreading data across multiple devices. The technique allows for balancing I/O loads and increasing data throughput. Conventional data striping requires storage of logical to physical address mapping for every stripe unit. For example, writing a stripe of data across eight die typically requires writing eight stripe units and storing eight logical to physical address mappings. Determining and storing the address mappings for every stripe unit requires time and consumes storage resources in a given storage system.

SUMMARY

In some aspects of the embodiments described herein, data striping is made more efficient by the transmission of a single data transfer request, having a single contiguous instruction portion includes a relative memory address or offset, and a data portion having multiple data segments to be written to multiple memory portions (e.g., flash memory die) in a memory device. All the multiple memory portions (e.g., flash memory die) in the memory device receive the same data transfer request, and each automatically identifies and stores the data segment corresponding to that memory portion. In another aspect, the single data transfer request includes one or more XOR instruction, and in response to that request a particular memory portion in the memory device locally generates an XOR value by XORing one or more of the data segments with either one or more of the other data segments or with a seed value, and locally storing the resulting XOR value, while other memory portions in the memory device each respond to the request by identifying and storing a data segment corresponding to that memory portion.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
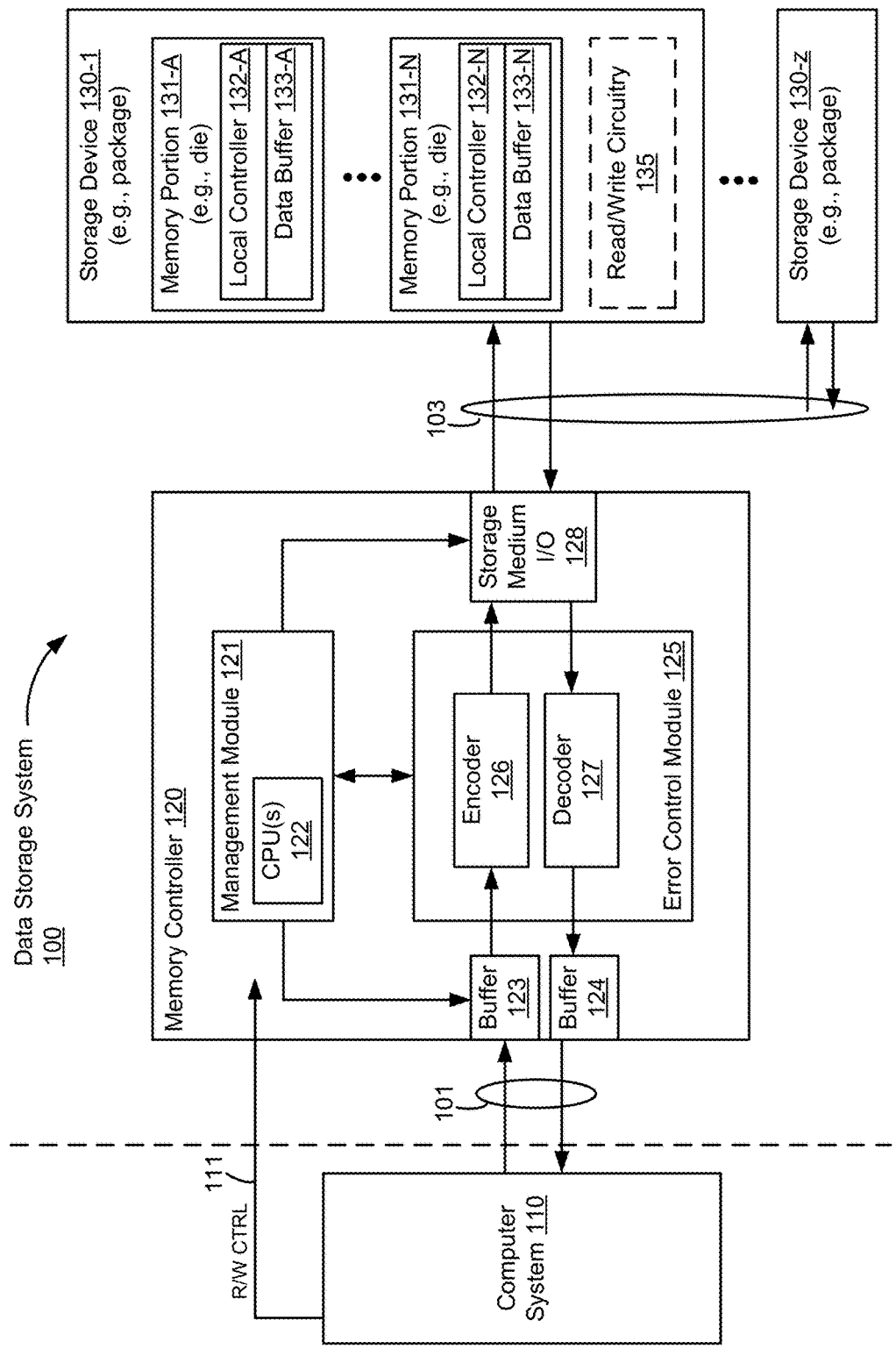
FIG. 1 is a block diagram illustrating an implementation of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, devices, and/or methods that may improve the reliability with which data can be retained by a storage device. Some implementations include systems, devices, and/or methods to assemble a single sub-request to perform a memory operation across memory portions. Some implementations include systems, devices and/or methods to perform memory operations at one or more memory portions in accordance with a received sub-request. Some implementations include systems, devices, and/or methods to back up data across memory portions.

(A1) In some embodiments, a memory controller receives a host command to perform a memory operation, where the host command includes a data packet comprising a plurality of data divisions. In response to receiving the host command, for each individual memory device of a plurality of memory devices in the set of memory devices, the memory controller assigns to the individual memory device a respective data division of the plurality of data divisions, where the respective data division includes a plurality of data segments, and each of the data segments corresponds solely to a distinct individual one of the memory portions (e.g., an individual flash memory die) of the individual memory device. The memory controller furthermore determines a single relative memory address associated with an address specified by the received host command, assembles a sub-request comprising a single contiguous instruction portion, which includes the single relative memory address and one or more instructions to perform the memory operation, and the respective data division, and transmits the sub-request to every memory portion of the individual memory device. In some embodiments, the respective data division follows the single contiguous instruction portion.

(A2) In some embodiments of the method of A1, the respective data division in the sub-request corresponds to a contiguous portion of the data packet in the received host command.

(A3) In some embodiments of the method of A1 or A2, the respective data division includes a same number of data segments as the number of memory portions of the individual memory device, and each of the data segments corresponds solely to an individual one of the memory portions of the individual memory device.

(A4) In some embodiments of the method of any of A1-A3, the respective data division includes M data segments, where M is greater than one, and each data segment of the M data segments comprises one or more pages of data.

(A5) In some embodiments of the method of any of A1-A3, the respective data division includes M data segments, where M is greater than one, and each data segment of the M data segments has a size equal to a non-integer multiple of the size of a page of data.

(A6) In some embodiments of the method of A5, the sub-request further comprises memory portion markers positioned between neighboring data segments of the M data segments.

(A7) In some embodiments of the method of any of A1-A6, the respective data division has a size equal to M multiplied by a data segment size, where M is greater than one.

(A8) In some embodiments of the method of any of A1-A7, the memory operation is a write operation and the single contiguous instruction portion of the sub-request includes a set of one or more write instructions.

(A9) In some embodiments of the method of any of A1-A8, the single relative memory address identifies a plane, a block and a page in each memory portion of the individual memory device.

(A10) In some embodiments of the method of any of A1-A9, each memory portion corresponds to a single die.

(A11) In some embodiments of the method of any of A1-A10, the single relative memory address of the sub-request does not include distinct memory addresses for each memory portion of the individual memory device.

(A12) In some embodiments of the method of any of A1-A11, the method further includes performing a wear leveling operation, including assigning a single wear level to the physical locations in the M memory portions corresponding to the single relative memory address.

(A13) In some embodiments of the method of any of A1-A12, the storage system comprises one or more three-dimensional (3D) memory devices, each with a 3D array of memory cells, and circuitry associated with operation of memory elements in the one or more 3D memory devices.

(A14) In some embodiments of the method of A13, the circuitry and one or more memory elements in a respective 3D memory device, of the one or more 3D memory devices, are on the same substrate.

(A15) In another aspect, an electronic system or device (e.g., data storage system 100, FIG. 1), includes a set of memory devices, each memory device comprising a number, greater than one, of memory portions, and a memory controller having one or more processors and memory storing one or more programs to be executed by the one or more processors. The memory controller is furthermore configured to perform or control performance of any of the methods A1-A14.

(A16) In some embodiments of the electronic system or device of A15, the memory controller includes a sub-request formation module for assembling the sub-request and a location determination module for determining the single relative memory address.

(B1) In some embodiments, a memory controller is configured to receive a host command to write data, where the host command includes a data packet comprising one or more data divisions and a backup request to backup at least a portion of the data packet. In response to receiving the host command, the memory controller: assigns a first data division of the data packet to a first memory device having M memory portions, where M is an integer greater than one, and the first data division includes a sequence of N data segments, where N is an integer less than or equal to M, determines a single relative memory address associated with an address specified by the host command, assembles a sub-request comprising the single relative memory address, the N data segments of the first data division, and a set of instructions, and transmits the sub-request to every memory portion of the M memory portions of the first memory device. The set of instructions in the sub-request includes instructions: to write the N data segments in N memory portions of the first memory device, to perform an XOR operation on one or more of the N data segments, and to write a resulting XOR value in a particular memory portion of the M memory portions of the first memory device.

(B2) In some embodiments of the method of B1, the set of instructions includes information to perform an XOR operation at a first memory portion of the M memory portions using at least one data segment in the sub-request and a predefined seed value stored in the first memory portion.

(B3) In some embodiments of the method of any of B1-B2, the predefined seed value stored in the first memory portion is derived from the at least one data segment.

(B4) In some embodiments of the method of any of B1-B2, the predefined seed value stored in the first memory portion is derived from the single relative memory address.

(B5) In some embodiments of the method of any of B1-B4, the set of instructions includes an instruction for the particular memory portion of the M memory portions to generate an XOR of all N data segments and to store the resulting XOR value in the particular memory portion.

(B6) In some embodiments of the method of any of B1-B4, the one or more XOR instructions includes an instruction for each memory portion of two or more of the M memory portions to generate an XOR of a particular pair of the N data segments and to store the resulting XOR value in the particular memory portion.

(B7) In some embodiments of the method of any of B1-B4, the number of data segments, N is equal to the number of memory portions, M, and the one or more XOR instructions includes an instruction for the particular memory portion to generate an XOR of a data segment corresponding to the particular memory portion, and to store the resulting XOR value in the particular memory portion.

(B8) In some embodiments of the method of any of B1-B7, each data segment has a size equal to a non-integer multiple of the size of a page of data, and the sub-request further comprises memory portion markers positioned among the data segments.

(B9) In some embodiments of the method of any of B1-B8, the storage system comprises one or more three-dimensional (3D) memory devices, each with a 3D array of memory cells, and circuitry associated with operation of memory elements in the one or more 3D memory devices.

(B10) In some embodiments of the method B9, the circuitry and one or more memory elements in a respective 3D memory device, of the one or more 3D memory devices, are on the same substrate.

(B11) In another aspect, an electronic system or device (e.g., data storage system 100, FIG. 1), includes a set of memory devices, each memory device comprising a plurality of memory portions, and a memory controller having one or more processors and memory storing one or more programs to be executed by the one or more processors. The memory controller is furthermore configured to perform or control performance of any of the methods B1-B10.

(B12) In some embodiments of the electronic system or device of B11, the memory controller includes a sub-request formation module for assembling the sub-request and a location determination module for determining the single relative memory address.

(B13) In some embodiments of the electronic system or device of B11 or B12, the memory controller includes a data backup module for determining if the host command includes a request to back up data at least a portion of the data packet.

(C1) In some embodiments, at a first memory portion of a plurality of memory portions is configured to determine a designated position of the first memory portion (e.g., in a predefined sequence of the plurality of memory portions), and to receive a sub-request conveyed to the plurality of memory portions in the first memory device, where the sub-request comprises a single contiguous instruction portion and a plurality of data segments, and the single contiguous instruction portion comprises a single relative memory address and a single set of one or more instructions to write the data segments. In some embodiments, the first memory portion detects that the received sub-request includes an instruction to write data, and in response to detecting the instruction to write data: identifies, of the plurality of data segments, a first data segment allocated to the first memory portion, places the first data segment into a buffer of the first memory portion, and writes the buffered first data segment to a location in non-volatile memory of the first memory portion, the location corresponding to the single relative memory address.

(C2) In some embodiments of the method of C1, each data segment comprises one or more pages of data.

(C3) In some embodiments of the method of any of C1-C2, each data segment has a size equal to a non-integer multiple of the size of a page of data.

(C4) In some embodiments of the method of C3, the sub-request further comprises memory portion markers positioned between neighboring data segments, and identifying the first data segment includes detecting receipt of a memory portion marker.

(C5) In some embodiments of the method of any of C1-C4, writing the buffered first data segment includes: determining if a first location in non-volatile memory of the first memory portion, identified in accordance with the relative memory address, includes one or more bad memory sub-portions; and in accordance with a determination that the first location includes one or more bad memory sub-portions, writing the buffered first data segment to a second location in non-volatile memory of the first memory portion, the second location corresponding to a remapping of the first location.

(C6) In some embodiments of the method of any of C1-C5, the single relative memory address identifies a page, (or a plane, a block and a page) in each memory portion of the plurality of memory portions.

(C7) In some embodiments of the method of any of C1-C6, the first memory portion corresponds to a single die.

(C8) In some embodiments of the method of any of C1-C7, the single relative memory address of the sub-request does not include distinct memory addresses for each memory portion of the first memory device.

(C9) In some embodiments of the method of any of C1-C8, the first memory portion comprises one or more three-dimensional (3D) memory devices, each with a 3D array of memory cells, and circuitry associated with operation of memory elements in the one or more 3D memory devices.

(C10) In some embodiments of the method of C9, the circuitry and one or more memory elements in a respective 3D memory device, of the one or more 3D memory devices, are on the same substrate.

(C11) In another aspect, a storage device (e.g., data storage device 130-1, FIG. 1), includes a set of memory devices, a first memory device of the set of memory devices comprising a plurality of memory portions, and one or more memory controllers for controlling operation of the storage system and responding to host commands. A first memory portion of the plurality of memory portions in the first memory device is configured to perform memory operations and to perform or control performance of any of the methods C1-C10.

(C12) In some embodiments of the storage device of C11, the first memory device includes read/write circuitry for selecting the location in non-volatile memory of the first memory portion, the location corresponding to the single relative memory address, and for causing performance of a write operation to write the buffered first data segment to the selected location in non-volatile memory of the first memory portion.

(C13) In some embodiments of the storage device of C11, the storage device includes read/write circuitry for selecting the location in non-volatile memory of the first memory portion, the location corresponding to the single relative memory address, and for causing performance of a write operation to write the buffered first data segment to the selected location in non-volatile memory of the first memory portion.

(C14) In yet another aspect, a non-transitory computer readable storage medium stores one or more programs for execution by one or more processors of an electronic system or device (e.g., data storage system 100, FIG. 1 or memory controller 120, FIG. 1), the one or more programs including instructions for performing or controlling performance of any of the methods A1-A14, B1-B10, or C1-C10 described herein.

(C15) In yet another aspect, an electronic system or device (e.g., data storage system 100, FIG. 1 or memory controller 120, FIG. 1) comprising means for performing or controlling performance of the operations of any of the methods A1-A14, B1-B10, or C1-C10 described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100 in accordance with some embodiments. While some example features are illustrated, various other features have not been illustrated for the sake of brevity and so as not to obscure more pertinent aspects of the example embodiments disclosed herein. To that end, as a non-limiting example, data storage system 100 is used in conjunction with a computer system 110. Data storage system 100 includes a memory controller 120 and one or more storage devices 130 (e.g., storage devices 130-1 to 130-z). In some embodiments, a respective storage device 130 includes a single memory device (e.g., a volatile memory device or a non-volatile memory (NVM) device such as a magnetic disk storage device, an optical disk storage device, a flash memory device, a three-dimensional (3D) memory device or another semiconductor NVM memory device). In some embodiments, a respective storage device 130 includes a plurality of memory devices. In some embodiments, a memory device includes one or more memory portions (e.g., one or more flash memory die). In some embodiments, each memory portion includes two or more individually addressable blocks (e.g., erase blocks). In one example, storage device 130-1 is one of four memory packages coupled with memory controller 120, and storage device 130-1 includes eight die. In some embodiments, storage device 130-1 (or each storage device 130 in data storage system 100) includes NAND-type flash memory or NOR-type flash memory. Further, in some embodiments, memory controller 120 is a solid-state drive (SSD) controller. However, one or more other types of storage media may be included in accordance with aspects of a wide variety of embodiments.

Computer system 110 is coupled with memory controller 120 through data connections 101, and optionally control line 111. However, in some embodiments, computer system 110 includes memory controller 120 as a component and/or a sub-system. Computer system 110 may be any suitable computing device, such as a desktop computer, a laptop computer, a tablet device, a netbook, an internet kiosk, a personal digital assistant, a mobile phone, a smart phone, a gaming device, a wearable computing device, a computer server, or any other computing device. Computer system 110 is sometimes called a host or host system. In some embodiments, computer system 110 includes one or more processors, one or more types of memory, a display, and/or other user interface components such as a keyboard, a touch screen display, a mouse, a track-pad, a digital camera, and/or any number of supplemental devices to add I/O functionality.

Each storage device 130 is coupled with memory controller 120 through connections 103. Connections 103 are sometimes called data connections, but typically convey commands in addition to data, and optionally convey addressing information, markers to separate data, programming instructions, metadata, error correction information, and/or other information in addition to data values to be stored in storage devices 130-1 through 130-z and data values read from storage devices 130 (i.e., storage devices 130-1 through 130-z). In some embodiments, however, memory controller 120 and storage devices 130s are included in the same device as components thereof. Furthermore, in some implementations memory controller 120 and storage devices 130s are embedded in a host device, such as a mobile device, tablet, other computer, or computer controlled device, and the methods described herein are performed by the embedded memory controller. Each storage device 130 may include any number (i.e., one or more) of memory devices including, without limitation, non-volatile semiconductor memory devices, such as flash memory. Furthermore, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

In FIG. 1, a respective storage device 130 (e.g., with one or more memory devices) includes a plurality of memory portions 131-A, . . . , 131-N. For example, a respective memory portion 131 is a die, block (e.g., an individually addressable block such as an erase block), word line, page or a set of die in storage device 130. In some embodiments, a respective storage device 130 or a memory portion 131 in storage device 130, is divided into a number of individually addressable (and, thus, individually selectable) blocks. In some embodiments, the individually selectable blocks are the minimum size erasable units in a flash memory device. Typically, when a flash memory block is erased, all memory cells in the block are erased simultaneously. Each block is usually further divided into a plurality of pages and/or word lines, where each page or word line is typically an instance of the smallest individually accessible (readable) memory portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, each storage device 130 includes read/write circuitry 135 for selecting a respective portion of storage device 130 on which to perform a memory operation (e.g., a read, write, or erase operation) and for causing performance of the memory operation on the respective portion of storage device 130. In some embodiments, read/ write circuitry 135 is embedded in each of the memory portions 131 (e.g., flash die) of storage device 130, in the form of a local controller 132 (sometimes called a low-level controller) in each memory portion 131. In some embodiments, the local controller 132 includes one or more processors and/or one or more state machines that cause the memory portion 131 to perform various memory operations on the memory portion 131. Further, in some embodiments, each memory portion 131 includes one or more data buffers 133 for temporarily storing data being written to the memory portion 131 or data being read from the memory portion 131.

In a typical implementation, without limitation, one block in a flash memory die includes a number of pages (e.g., 64 pages, 128 pages, 256 pages, or another suitable number of pages). In some implementations, blocks in a flash memory die are grouped into a plurality of zones, sometimes called planes. Flash memory die having more than one plane (or zone) are sometimes called multi-plane flash memory die. Typically, each block zone of the die is in a physically distinct region of the die, such as a particular half or particular quadrant of the memory cell array in the die. In some implementations, each block zone of a flash memory die is independently managed to some extent, which increases the degree of parallelism for parallel operations and simplifies management of the respective storage device 130 that includes the flash memory die.

In some embodiments, memory controller 120 includes management module 121, input buffer 123, output buffer 124, error control module 125, and storage medium interface 128. In some embodiments, memory controller 120 includes various additional features that have not been illustrated for the sake of brevity and so as not to obscure more pertinent features of the example embodiments disclosed herein, and that a different arrangement of features may be possible. Input buffer 123 and output buffer 124 provide an interface to computer system 110 through data connections 101. Similarly, storage medium interface 128 provides an interface to storage device 130 though connections 103. In some embodiments, storage medium interface 128 includes read and write circuitry, including circuitry capable of providing reading signals to storage device 130 (e.g., reading threshold voltages for NAND-type flash memory).

In some embodiments, management module 121 includes one or more processing units 120 (also sometimes called one or more processors, central processing units or CPUs) configured to execute instructions in one or more programs (e.g., programs stored in controller memory, in management module 121). In some embodiments, one or more CPUs 122 are shared by one or more components within, and in some cases, beyond the function of memory controller 120. Management module 121 is coupled with input buffer 123, output buffer 124 (connection not shown), error control module 125, and storage medium interface 128 in order to coordinate the operation of these components.

Error control module 125 is coupled with storage medium interface 128, input buffer 123 and output buffer 124. Error control module 125 is provided to limit the number of uncorrectable errors inadvertently introduced into data. In some embodiments, error control module 125 is executed in software by one or more CPUs 122 of management module 121, and, in other embodiments, error control module 125 is implemented in whole or in part using special purpose circuitry to perform encoding and decoding functions. To that end, error control module 125 includes an encoder 126 and a decoder 127. In some embodiments, error control module 125 is configured to encode data (i.e., with encoder 126) and decode read data (i.e., with decoder 127) according to one of a plurality of ECC techniques, such as Reed-Solomon, turbo-code, Bose-Chaudhuri-Hocquenghem (BCH), low-density parity check (LDPC), or other error control codes, or a combination thereof.

Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, input buffer 123 receives data to be stored in one or more storage devices 130 from computer system 110 (e.g., write data). The data received by input buffer 123 is made available to encoder 126, which encodes the data by applying an error control code to produce one or more codewords. The one or more codewords are made available to storage medium interface 128, which transfers the one or more codewords to one or more storage devices 130 in a manner dependent on the type of storage medium being utilized.

In some embodiments, a read operation is initiated when computer system (host) 110 sends one or more host read commands to memory controller 120 (e.g., via data connection 101 and/or control line 111) requesting data from data storage system 100. In response to the one or more host read commands, memory controller 120 sends one or more read access commands to one or more of storage devices 130 (e.g., via storage medium interface 128), to obtain "raw" read data in accordance with memory locations (or logical addresses, object identifiers, or the like) specified by the one or more host read commands. Storage medium interface 128 provides the raw read data (e.g., comprising one or more codewords) to decoder 127. Decoder 127 applies a decoding process to the encoded data to recover the data, and to correct errors in the recovered data within the error correcting capability of the error control code that was used to encode the codeword. If the decoding is successful, the decoded data is provided to output buffer 124, where the decoded data is made available to computer system 110. In some embodiments, if the decoding is not successful, memory controller 120 may resort to a number of remedial actions or provide an indication of an irresolvable error condition.

Flash memory devices (e.g., in storage medium 130) utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, mean the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
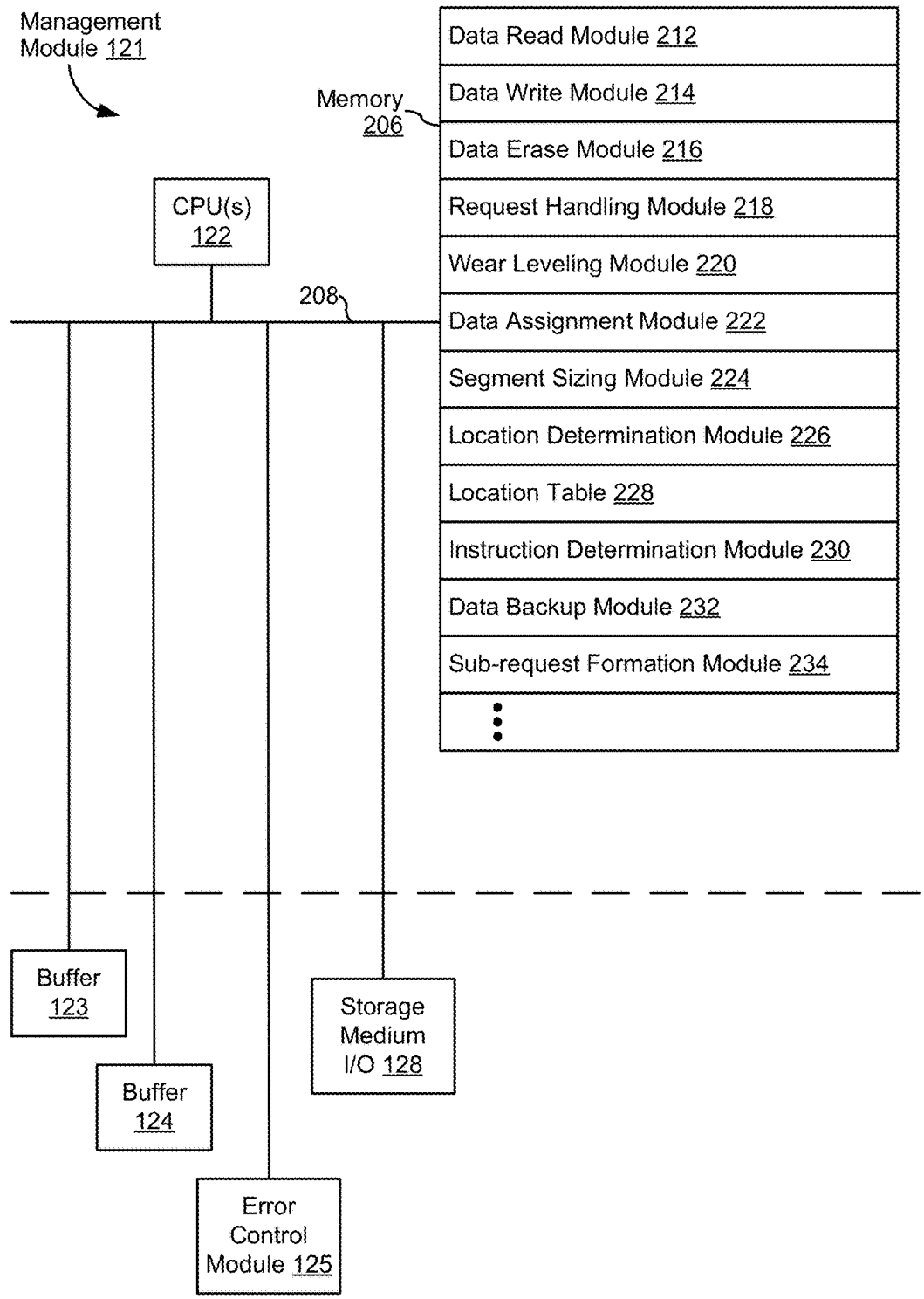
FIG. 2 is a block diagram illustrating an implementation of a management module in accordance with some embodiments.

FIG. 2 is a block diagram illustrating an exemplary management module 121, in accordance with some embodiments. Management module 121 typically includes one or more processing units 122 (also sometimes called CPU(s), processor(s), microprocessor(s), microcontroller(s), or core(s)) for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121 is coupled with input buffer 123, output buffer 124, error control module 125, and the one or more storage devices 130 by the one or more communication buses 208. Memory 206 includes volatile memory (e.g., high-speed random access memory devices, such as DRAM, SRAM, DDR RAM, or other random access solid state memory devices), and may include non-volatile memory (e.g., one or more NVM devices, such as magnetic disk storage device(s), optical disk storage device(s), flash memory device(s), or other non-volatile solid state storage device(s)). Memory 206 optionally includes one or more storage devices remotely located from the one or more processing units 122. Memory 206, or alternately the non-volatile memory device(s) within memory 206, comprises a non-transitory computer readable storage medium.

In some embodiments, memory 206, or the computer readable storage medium of memory 206 stores the following programs, modules, and data structures, or a subset or superset thereof:

data read module 212 for reading data, or causing data to be read, from storage devices 130;

data write module 214 for writing data, or causing data to be written, to storage devices 130;

data erase module 216 for erasing data, or causing data to be erased, from storage devices 130;

request handling module 218 for receiving memory operation commands from the host (e.g., computer system 110, FIG. 1) or other internal processes;

wear leveling module 220 for optimally determining pages or blocks of storage devices 130 for storing data so as to evenly wear the pages or blocks of storage device 130;

data assignment module 222 for assigning respective divisions (i.e., portions) of data in a data packet (e.g., for reading or writing) to respective storage devices 130 in data storage system 100;

segment sizing module 224 for determining or allocating the size of one or more data segments of a respective data division of data being sent to one or more storage devices 130 for storage, where in some embodiments the number of data segments is less than or equal to the number of memory portions (e.g., die) in the one or more storage devices 130;

location determination module 226 for determining a single relative memory address across one or more memory portions in a respective storage device 130, where in some embodiments the single relative memory address includes a physical address that is associated with or derived or mapped from an address specified by a host command;

location table 228 for maintaining and storing a logical-to-physical map which maps logical addresses recognized by the host (e.g., computer system 110, FIG. 1) to physical addresses in one or more storage devices 130;

instruction determination module 230 for determining, forming or assembling instructions sent to one or more storage devices 130, where in some embodiments the instructions are associated with a host command to perform a memory operation, and in some embodiments the instructions are assembled into a single contiguous set;

data backup module 232 for determining if a host command includes a request to back up data to be written to a respective storage device 130, and in some embodiments determining XOR instructions for performing a back up of data to one or more memory portions of the storage device 130;

sub-request formation module 234 for assembling a sub-request comprising one or more of a single relative memory address (e.g., from location determination module 226) and one or more instructions (e.g., a single contiguous set of instructions from module 230 and/or XOR instructions from module 232) to send to a respective storage device 130, where in some embodiments the sub-request includes data to be written to the respective storage device 130 (e.g., a respective data division assigned to the respective storage device 130).

The terms "division" and "data division" mean a portion of a data packet, and more specifically mean the portion of a data packet that is sent to a memory device for storage. This term does not, by itself, specify any particular way of determining which portion of a data packet is the data division sent to a particular memory device, although in some embodiments each data division of a data packet consists of a contiguous portion of the data packet.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments the above identified modules or programs perform operations on one or more storage devices. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing any of the methods described below with reference to FIGS. 12A-12C, 13A-13B and 14A-14B. In some embodiments, some or all of these modules may be implemented with reference to FIGS. 12A-12C, 13A-13B and 14A-14B specialized hardware circuits that subsume part or all of the module functionality.

Although FIG. 2 shows a management module 121, FIG. 2 is intended more as functional description of the various features which may be present in a management module than as a structural schematic of the embodiments described herein. In practice, and as recognized by those of ordinary skill in the art, items shown separately in FIG. 2 could be combined and some items could be separated.

Figure 3A:
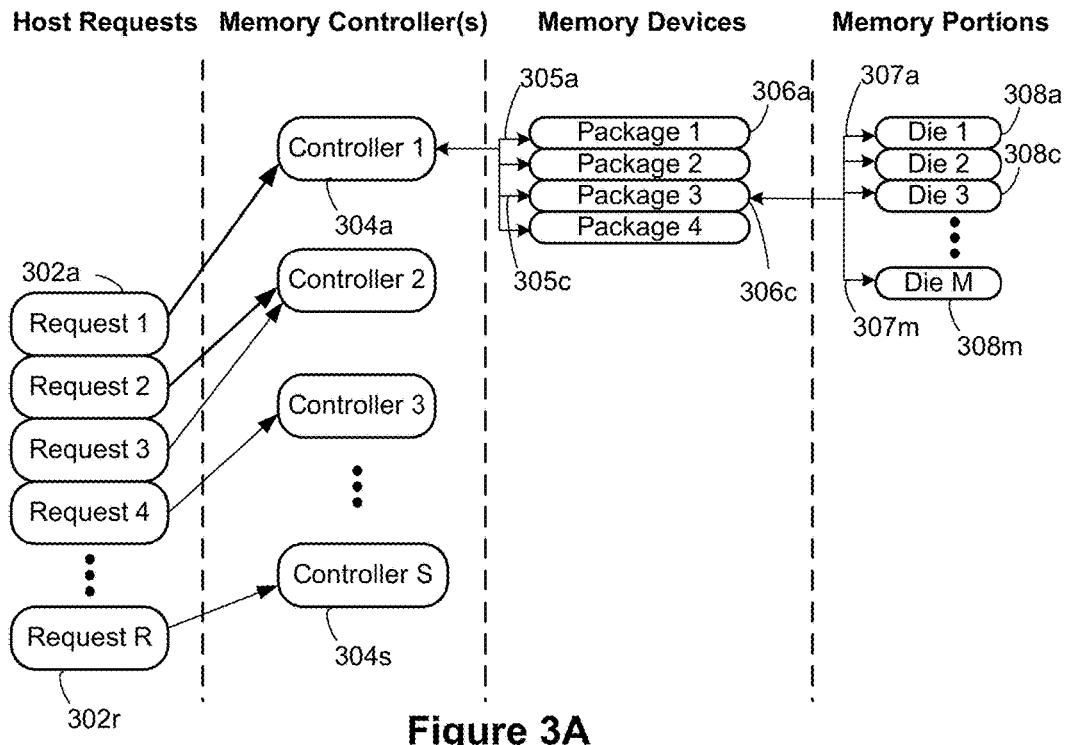
FIG. 3A is a diagram of writing data to memory, in accordance with some embodiments.

FIG. 3A illustrates a conventional approach to sending requests to memory portions 308 of memory devices 306, such as host requests 302 from a host (e.g., computer system 110, FIG. 1) to read or write data. In some embodiments, memory portions 308 are die (e.g., non-volatile flash memory), and memory devices 306 (e.g., packages) include one or more die. One or more host requests 302 go to one controller of controllers 304. For example, host request 1 302a is a request to write data, sent to controller 1 304a. Controller 1 304a interprets that request by assigning the data to a memory device 306c (e.g., package 3), assigning segments of the data to individual memory portions 308 of the memory device 306c, and sending multiple die-specific requests 307 via path 305c to device 306c, which conveys the multiple die-specific requests 307 to corresponding individual die 308. In this system architecture, die-specific requests 307 include die-specific (or, equivalently, data segment-specific) address information for every memory portion 308 of a given memory device (e.g., device 306c) to which data is sent for storage.

Figure 3B:
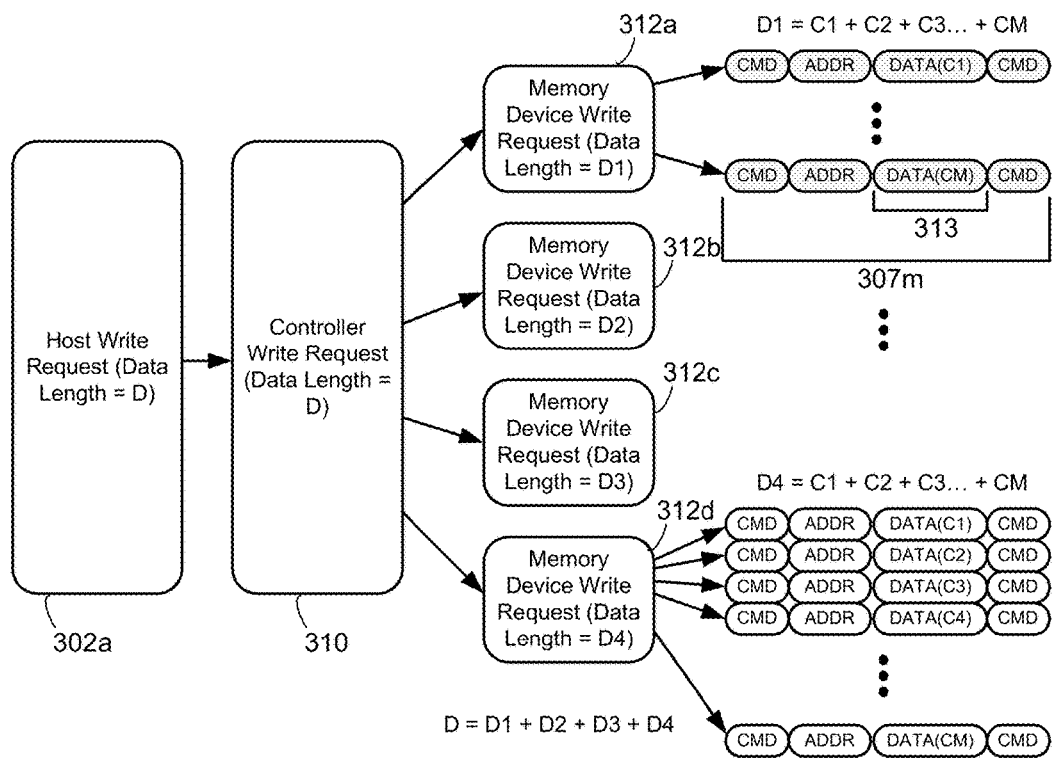
FIG. 3B is a diagram of data packet partitioning in accordance with some embodiments.

FIG. 3B is a diagram of a conventional approach to data packet partitioning. This diagram illustrates an exemplary host request 302a to write data to various die, as shown in FIG. 3A above. In this example, a data packet of length D is received at the controller from the host. The controller (e.g., controller 304a) partitions the data of length D in a write request 310, across the four memory devices 306 (e.g., packages 1-4) it is communicatively coupled to. In this example, data packet D is partitioned into 4 equally-sized data divisions, D1, D2, D3 and D4, issued as memory device write requests 312 (e.g., 312a-312d). Each data division is then further divided into as many data segments (e.g., data segment 313), as there are memory portions 308 (e.g., die 1-M) of the associated memory device (e.g., D1=C1+C2+C3 . . . +CM). These data segments are assigned to respective memory devices by die-specific requests (e.g., die-specific request 307m to die M of package 3 306c, FIG. 3A). This approach requires two tiers of data partitioning for one host write request, and lengthy processing time by a controller to address every data segment to a particular memory portion. In a similar, but reversed fashion, the controller issues a two-tiered read request to retrieve data from memory portions of a memory device. This requires retrieving addressing information for each data segment to be reassembled back into a data division of a data packet.

Figure 4:
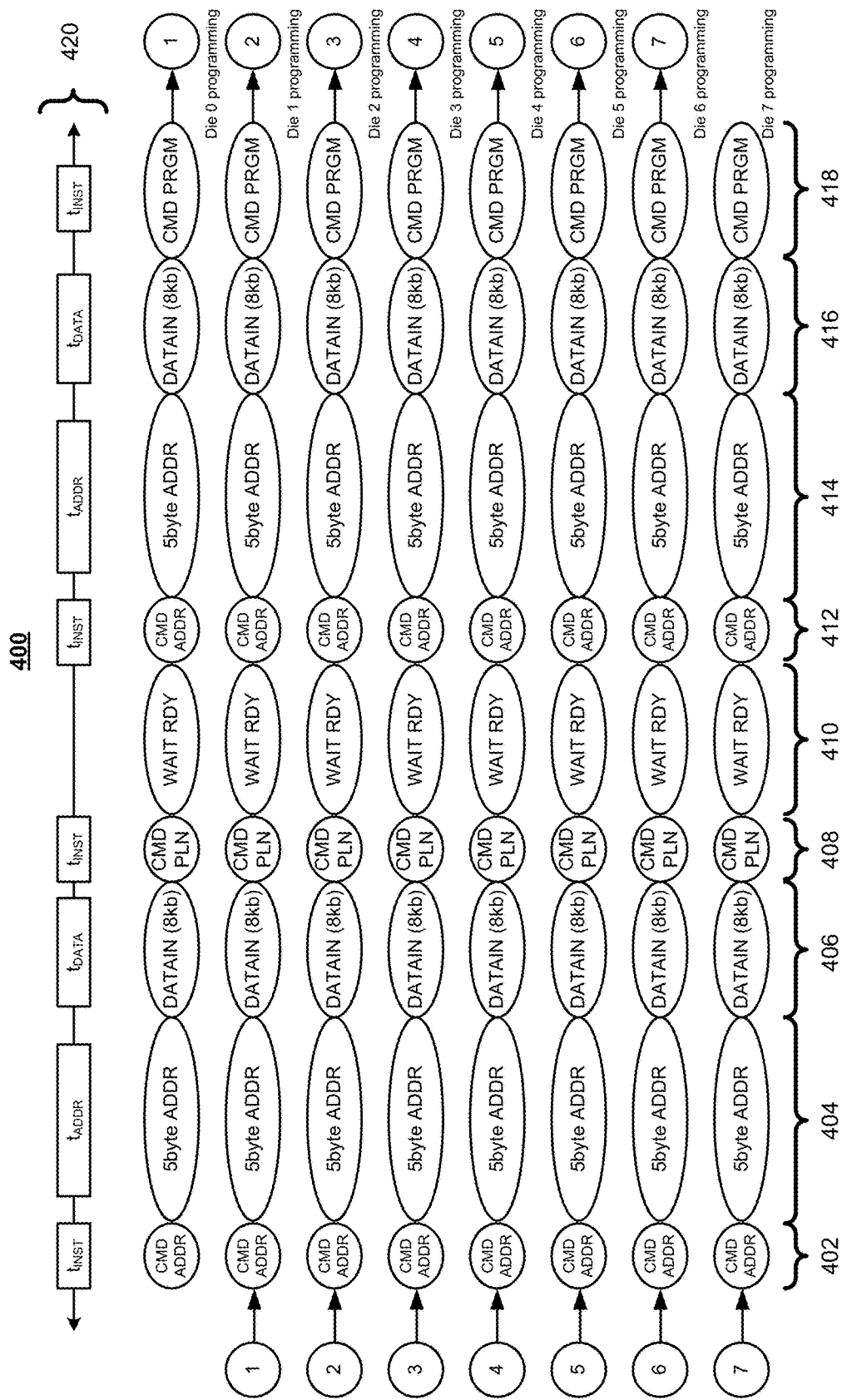
FIG. 4 is a phase timing diagram of a conventional data striping sub-request in accordance with some embodiments.

FIG. 4 is an example of a phase timing diagram of a conventional set of requests to write data segments in multiple die of a storage device 130. In this example, a controller (e.g., controller 304a, FIG. 3A), sends a set of requests 400 to a package (e.g., a particular storage device 130), for writing data segments 406 and 416 onto the die of the package. FIG. 4 illustrates a set of requests 400 for writing data onto eight die of a particular package.

The set of requests 400 includes various instructions, address information and data segments interspersed throughout the set of requests, to write data onto the eight die. This approach illustrates serially sending die-specific requests to perform write operations, which in this example write one 8 kb page of data per plane to each die of eight die. For each die, the set of requests 400 includes an address-initializing instruction 402 preceding 5-byte address 404, and address-initializing instruction 412 preceding 5-byte address 414. Writing to both planes of a respective multi-plane die requires separately addressing of the page location of each plane in each die. For example, 5-byte address 404 identifies the specific die, plane, block and page for writing the data in the following data segment 406. Similarly, 5-byte address instruction 414 identifies the specific die, plane, block and page for writing the data in the following data segment 416, which is written to the same die as data segment 406. In some embodiments, the set of requests 400 include a plane-switching instruction 408, followed by a wait instruction 410 before the addressing and data instructions for a second plane of a respective die. In this example, programming instruction 418 indicates to a respective memory portion that the preceding data (e.g., data segment 406 and data segment 416) is to be written to memory.

The serial nature of writing data to all the die of a memory package using a sequence of separate die-specific instructions results in several limitations. For example, the memory controller experiences extensive overhead while partitioning data into data segments, and generating a separate write command for each die and separately addressing every individual data segment (e.g., a page) for every individual die. For the approach shown in FIG. 4, the speed of writing data packets received from the host is limited by the speed of generating and transmitting die-specific commands to individual die of a package. Additionally, burst-write capability is limited in speed due to the lack of parallelism at the die level of the storage system.

FIG. 4 additionally shows timeline 420, illustrating the time for performing one set of data and addressing instructions to program one die out of the set of eight die receiving the set of requests 400. In this exemplary timeline 420, the time to perform an instruction is represented by $t_{INST}$, the time to read out address 404 is $t_{ADDR}$ and the time to set up and hold the data for data segment 406 or data segment 416 is $t_{DATA}$. In this exemplary timeline 420, the time to send the set of requests 400 to all eight die of the memory device, is $8*(t_{INST}+t_{ADDR}+t_{DATA}+t_{INST}+t_{INST}+t_{ADDR}+t_{DATA}+t_{INST})= 32*t_{INST}+16*t_{ADDR}+16*t_{DATA}$.

Figure 5A:
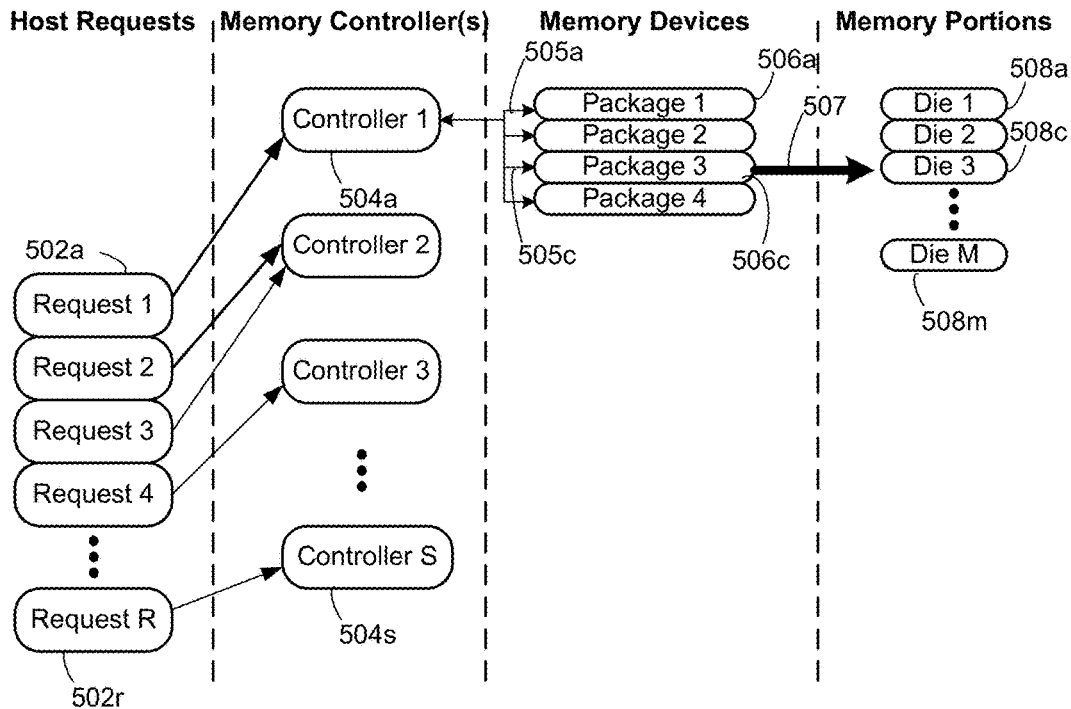
FIG. 5A is a diagram of writing data to memory, in accordance with some embodiments.

FIG. 5A is a diagram of writing data to memory, in accordance with some embodiments. FIG. 5A illustrates an improved technique (as compared to the one in FIG. 3A), for sending requests 502, to memory portions 508, associated with host commands. In some embodiments, memory portions 508 are die (e.g., non-volatile flash memory), and one or more memory devices 506 (e.g., packages) include one or more die. One or more host requests 502 go to one controller of controllers 504. For example, host request 1 502a, which is a request to write data, is sent to controller 1 504a. Controller 1 504a interprets that request by assigning a division (e.g., a portion) of the data specified by request 502a to a memory device 506c (e.g., package 3) and sending a corresponding sub-request 505c, which includes the assigned data division, to device 506c. In some embodiments, when generating the sub-request to be sent to a particular memory device, controller 1 504a determines a single relative memory address associated with an address specified by the received host command. For example, controller 1 504a determines that host request 1 502a includes a command to write data to a particular logical address, and retrieves or obtains a corresponding physical address offset, herein called a relative memory address. In this example, the physical address offset is a single relative memory address that indicates a relative position within each memory portion 508 of memory device 506c (e.g., package 3) at which to store a data segment of the data division included in sub-request 506c. From another viewpoint, the addresses in memory device 506c at which the data segments are to be stored are addresses obtained by adding the relative memory address (or a portion of that relative memory address that specifies an address offset) specified by sub-request 506c to a base address for each memory portion 508 of memory device 506c to which data is to be stored.

Sending a single sub-request having a single relative memory address is in contrast to sending multiple sub-requests (to memory portions in memory device 506c) that each specify distinct, individual addresses for individual memory portions involved in the storage or retrieval of data associated with a host command, shown in FIG. 3A. In some embodiments, the single relative memory address is an offset value, such as an offset from a base location or address of each memory portion of the memory device or an offset from the last physical address to which data was written in each memory portion of the memory device. In some embodiments, the single relative memory address specifies or corresponds to the same physical memory address within each memory portion (e.g., the same local physical address, indicating the same block B and page P, within each flash memory die in the memory device).

As shown in FIG. 5A, controller 1 504a does not create several "die-specific requests," but rather sends a single, package-level request 507 to all the memory portions of the corresponding memory device 506c (e.g., all the die of package 3). In some embodiments, the single, package-level request 507 is the same as sub-request 505c (e.g., sub-request 505c passes through a package to the die with adding additional information and without additional processing). For ease of discussion, except when otherwise indicated, a single package-level request will hereinafter be considered to be the same as a corresponding sub-request. However, in some embodiments or in some circumstances, a single package-level request differs from a corresponding sub-request. For example, in some embodiments, additional processing is performed on sub-request 505c to produce the single, package-level request 507.

In some embodiments, sub-request 505c includes a single contiguous set of one or more instructions to perform a memory operation. In other words, in some embodiments, sub-request 505c does not include separate, individualized instructions for performing a memory operation at each memory portion of the corresponding memory device.

Figure 5B:
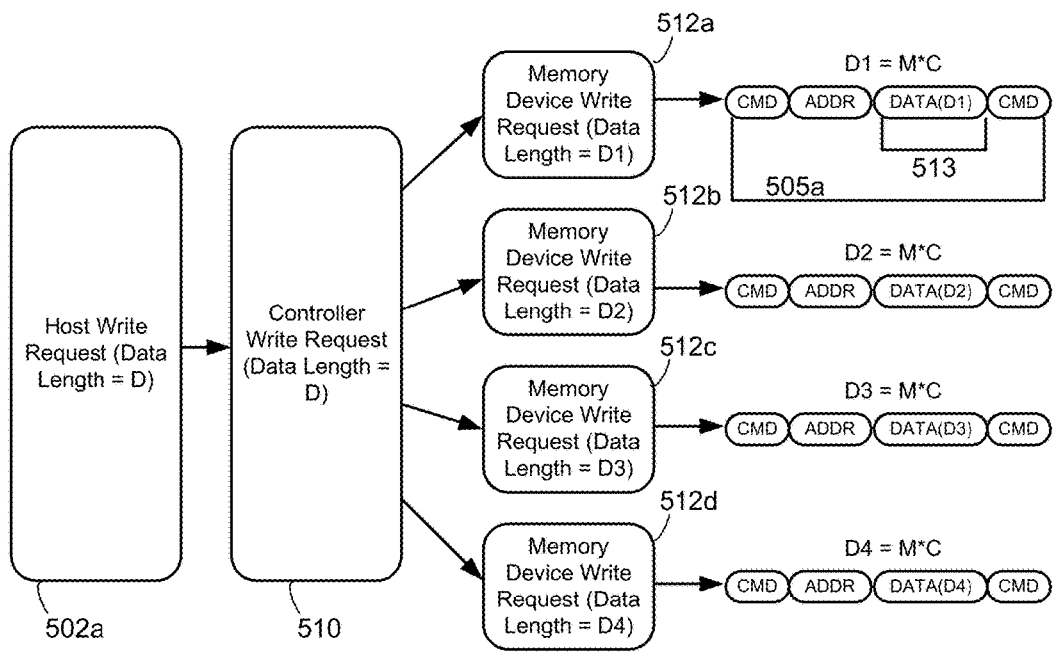
FIG. 5B is a diagram of data packet partitioning in accordance with some embodiments.

FIG. 5B is a diagram of data packet partitioning in accordance with some embodiments. This diagram illustrates an exemplary host request 502a to write data to a data storage system, as shown in FIG. 5A above. In this example, a data packet of length D is received at the controller (e.g., controller 1 504a) from the host. The controller partitions the data across four memory devices 506 (e.g., packages) to which it is communicatively coupled. In this example, data packet D is partitioned into four equally-sized data divisions, D1, D2, D3 and D4. In contrast to the example shown in FIG. 3A, each data division (e.g., D1-D4) is not further divided into M portions for storage in the M memory portions (e.g., M die) in the associated memory device. FIG. 5B shows that in some embodiments, a sub-request 505a contains the entire associated data division 513, without being partitioned. In some embodiments, a data division includes as many equally-sized data segments as there are memory portions in the associated memory device (e.g., M memory portions, each having a data segment of size C), but the data division is not partitioned by commands and/or addresses between the data segments. This reduction in addressing of individual data segments allows for simpler, faster processing by the controller (e.g., controller 1 504a, FIG. 5A).

Figure 6:
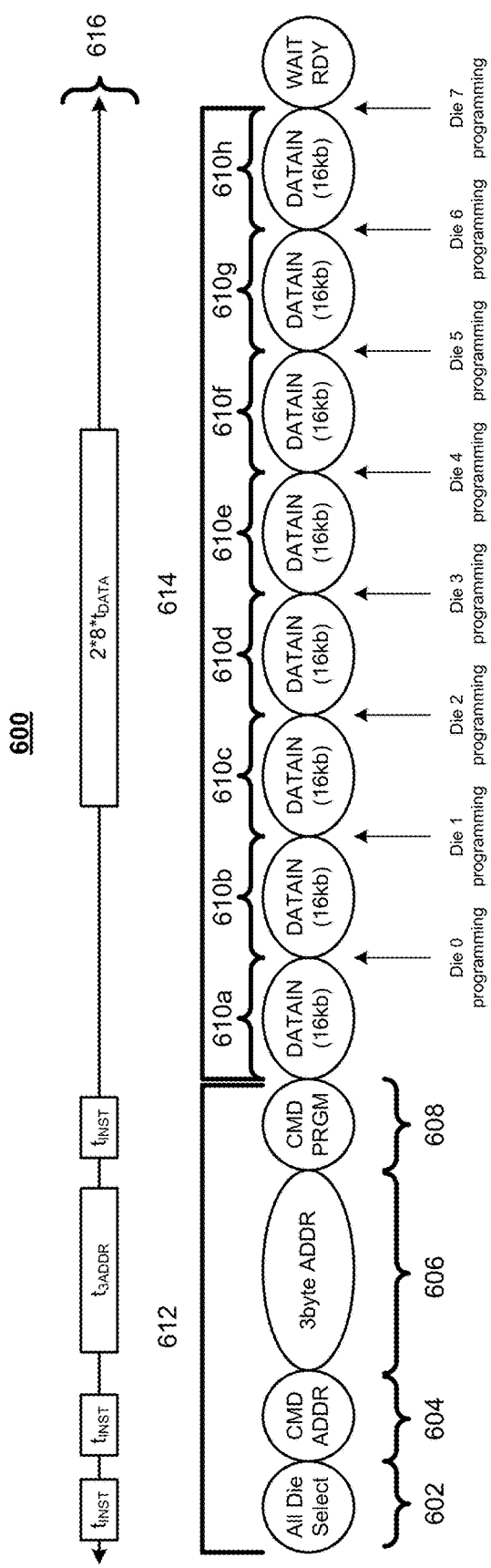
FIG. 6 is a phase timing diagram of a first sub-request in accordance with some embodiments.

FIG. 6 is a phase timing diagram of a first example of a sub-request in accordance with some embodiments. FIG. 6 illustrates a sub-request 600 that includes a first contiguous portion, herein called an instruction portion 612, and a second contiguous portion, herein called a data portion 614. In some embodiments, the instruction portion 612 includes a contiguous sequence of addressing and programming instructions, such as instructions 602, 604, 606 and 608. In some embodiments, sub-request 600 includes one contiguous set of instructions followed or preceded by one contiguous set of data segments 610. In the example shown in FIG. 6, each data segment 610 consists of two complete 8 kb pages.

Sub-request 600 illustrates a streamlined approach to data striping across memory portions of a memory device. Instruction portion 612 includes an all-die-select instruction 602 to instruct each memory portion to scan sub-request 600 for data corresponding to that memory portion. This is followed by an address-initializing instruction 604 to instruct each memory portion that a single relative memory address 606 will follow. In exemplary sub-request 600, single relative memory address 606 is a 3-byte address to identify a block and page within each memory portion (e.g., each die). In this example, the single relative memory address 606 is able to be condensed from 5 bytes (as shown in FIG. 4), to 3 bytes, because there is no need to identify a memory portion (e.g., die), or plane in this case. The instruction portion 612, including memory address 606 applies to every memory portion, equally, therefore there is no need to reserve addressing space for identifying specific memory portions. Since each data segment 610 consists of two complete 8 kb pages, both planes at the physical location corresponding to memory address 606, are to be filled. Programming instruction 608 instructs the memory portions receiving sub-request 600 to each perform a write operation on a corresponding portion of the data within sub-request 600.

In some embodiments or in some circumstances, a sub-request sent to all the memory portions of a memory device includes a data-read instruction instead of programming instruction 608, in which case the sub-request can be called a read sub-request. In such embodiments or circumstances, the sub-request includes no data segments, and thus has only instruction portion 612 (FIG. 6). In response to the read sub-request, memory portions retrieve data segments in accordance with single relative memory address 606 and load them into a buffer (e.g., data buffer 133, FIG. 1) for transmitting to the memory controller that sent sub-request 600.

In some embodiments or in some circumstances, a sub-request includes an erase instruction instead of programming instruction 608, in which case the sub-request can be called an erase sub-request. In such embodiments or circumstances, the sub-request includes no data segments, and thus has only instruction portion 612 (FIG. 6). In response to the erase sub-request, memory portions locate data segments in accordance with single relative memory address 606 and erase the contents of those locations in memory. Typically, erasing is performed on block-sized data segments in each memory portion, since blocks are the minimum size erasable units in a flash memory device.

In the write sub-request example shown in FIG. 6, data segments 610 are equally-sized and each contain two pages worth of data (e.g., for an 8 kb page size). In this example, a respective die writes the data in its associated data segment on both planes at the location determined by the single relative memory address 606. For example, the first data segment 610a is written to die 0 of the memory package that receives sub-request 600, and more specifically the first 8 kb page of the first data segment 610a is written to plane 0 and the second 8 kb page of the first data segment 610a is written to plane 1 of die 0. Similarly, each of the other data segments 610b-610h are written in part to plane 0 and in part to plane 1 of a corresponding memory portion (e.g., flash memory die), at locations within those planes and die specified by the single relative memory address 606 of the write sub-request 600.

In some embodiments, at least one memory portion (and in some embodiments each memory portion) receiving sub-request 600 is programmed to store an entire data segment 610 at the one or more physical addresses in the memory portion specified by the single relative memory address 606. In some embodiments, at least one memory portion in a memory device is programmed to recognize its relative position among the other memory portions. In some embodiments, each memory portion in a memory device is programmed to determine which data segment 610 in the data portion 614 it is assigned to store. For example, die 4 is programmed to recognize that it is the fifth die in a package and it is programmed to detect the fifth data segment 610e, to write to its memory. In some embodiments, the determination of which data segment in the data portion to store is made by scanning the received data portion 614, counting data segments, or using a predetermined data portion offset, until the data segment corresponding to that data portion is received. Data segments (if any) received prior to the data segment corresponding to the memory portion are counted, but not stored, and the data segment corresponding to the memory portion is stored in the memory portion at one or more locations (e.g., within one or more planes) within the memory portion, as specified by the single relative memory address 606.

FIG. 6 additionally shows timeline 616, illustrating the time for sending data and addressing instructions to a set of eight die receiving sub-request 600. In this exemplary timeline 616, the time to send an instruction is represented by $t_{INST}$, the time to send address 606 is $t_{3ADDR}$ (i.e., a different, shorter time than $t_{ADDR}$ in FIG. 4) and the time to send the data for one 8 kb page is $t_{DATA}$. In this exemplary timeline 616, the time to send sub-request 600 to all eight die of the memory device, is $t_{INST}+t_{INST}+t_{3ADDR}+t_{INST}+2*8*t_{DATA}=3*t_{INST}+t_{3ADDR}+16*t_{DATA}$. In comparison, the total time for performing instructions and addressing the data segments in sub-request 400, FIG. 4, was $32*t_{INST}+16*t_{ADDR}+16*t_{DATA}$.

Figure 7:
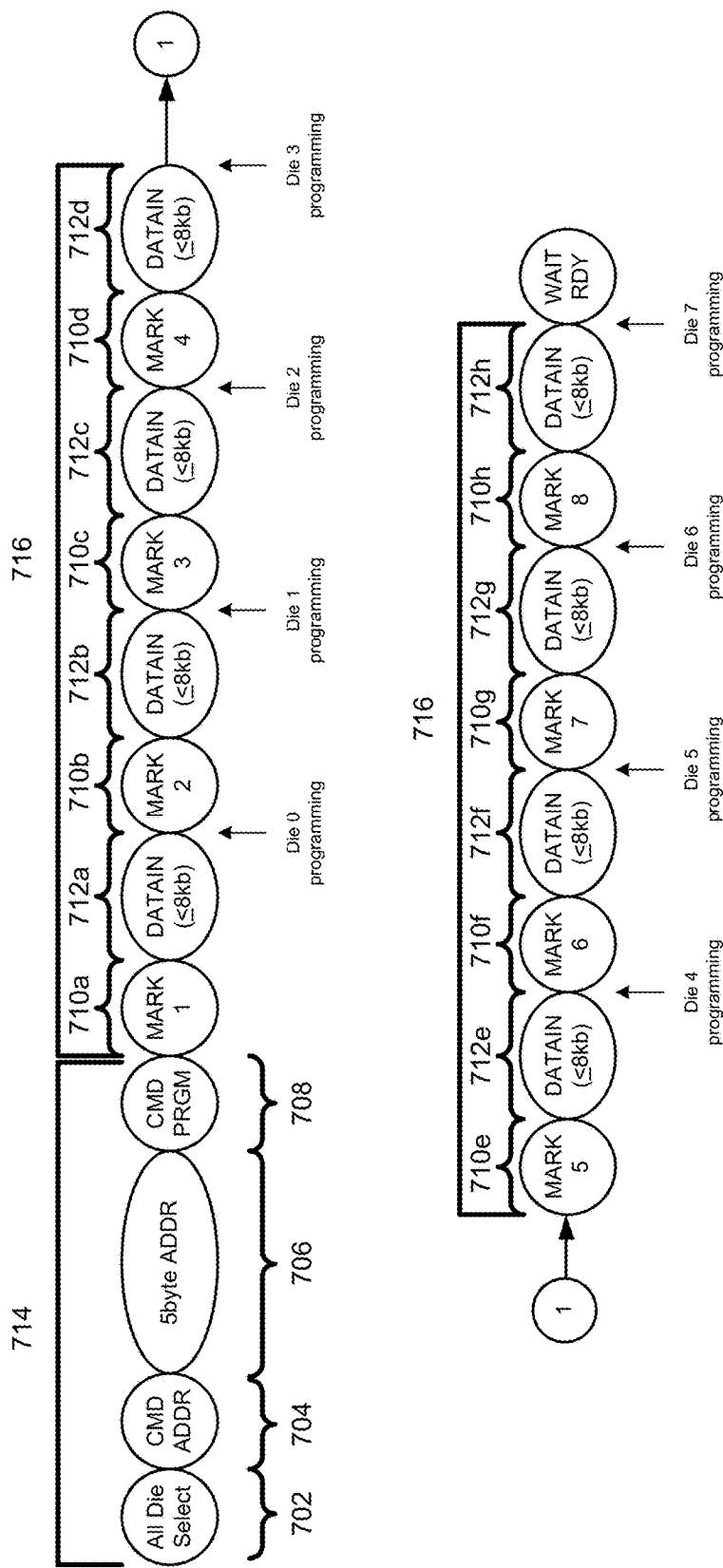
FIG. 7 is a phase timing diagram of a second sub-request in accordance with some embodiments.
Figure 8:
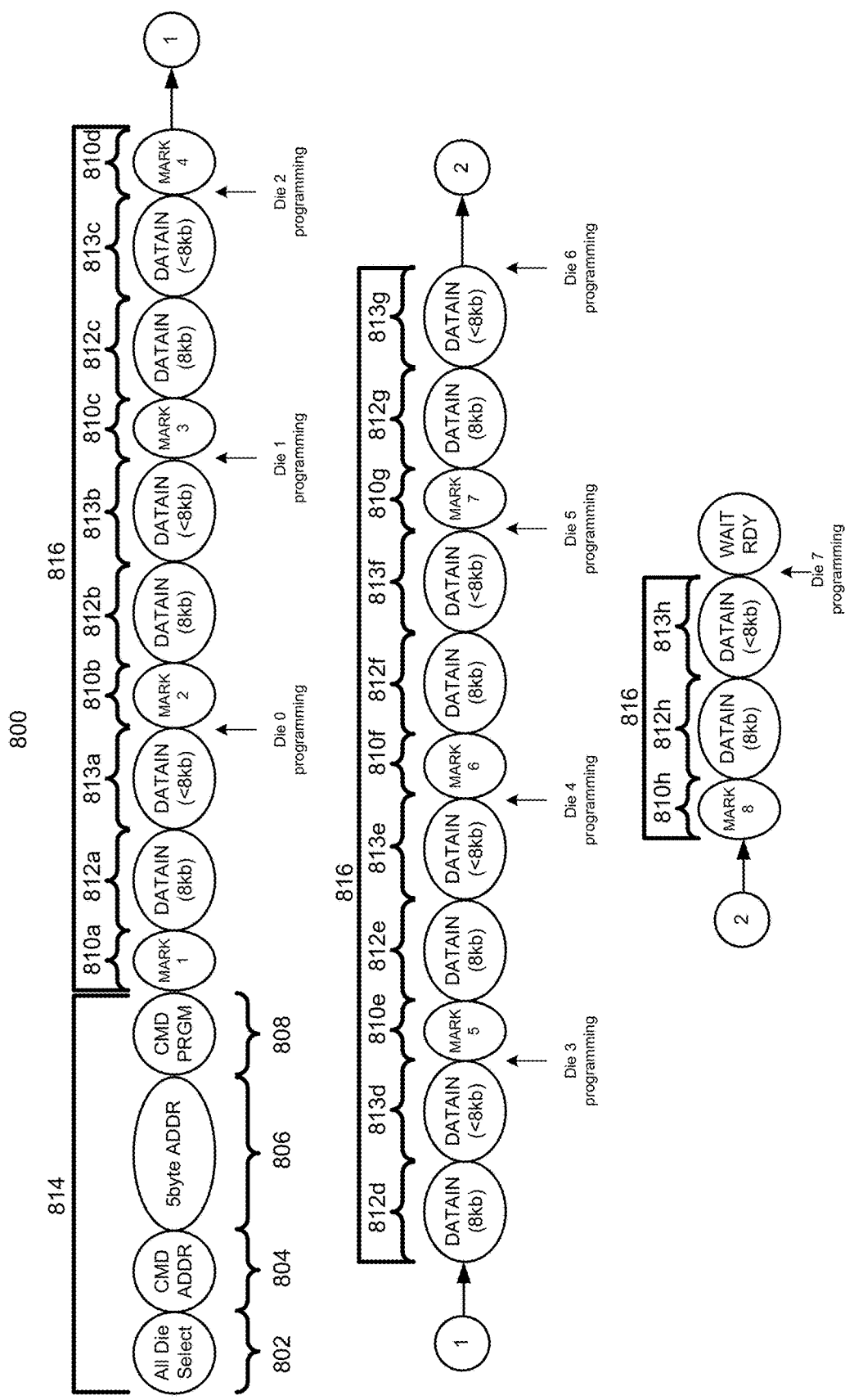
FIG. 8 is a phase timing diagram of a third sub-request in accordance with some embodiments.
Figure 9:
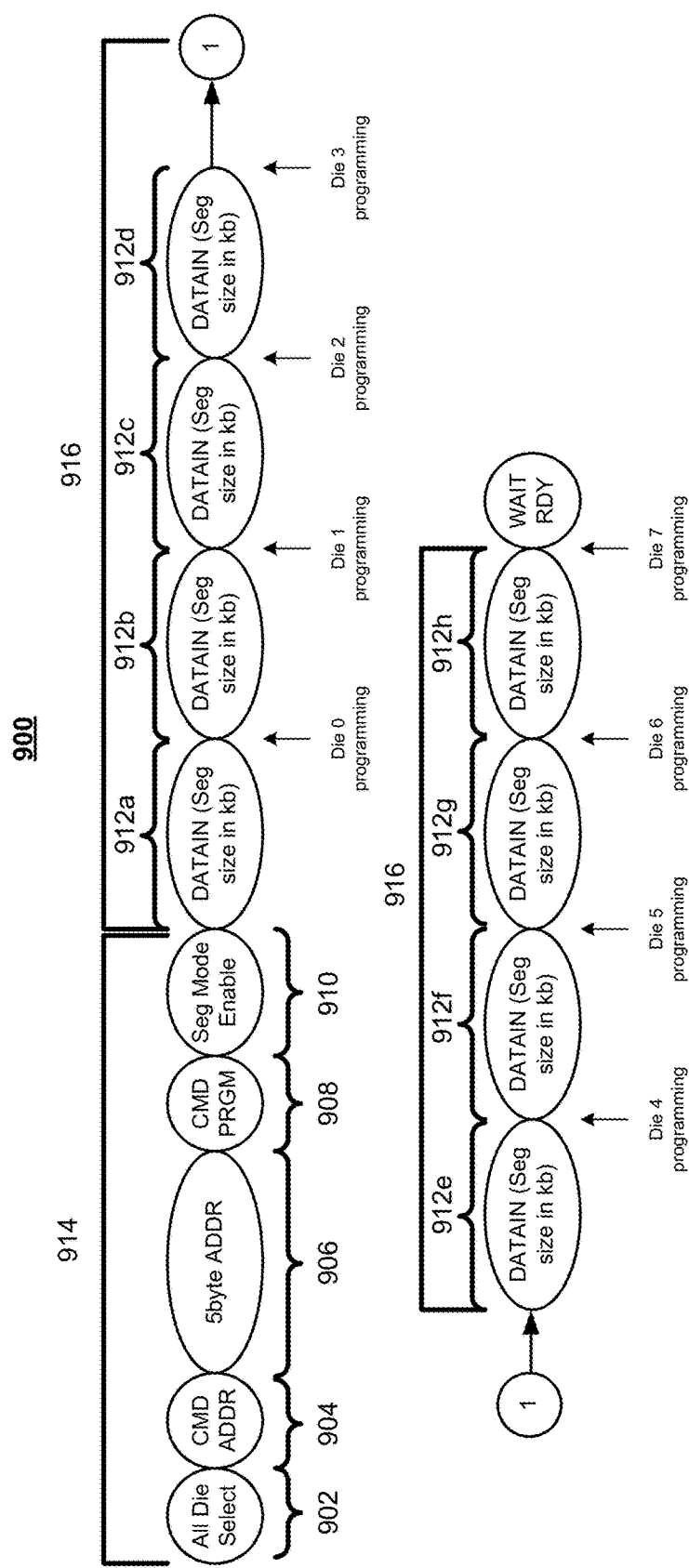
FIG. 9 is a phase timing diagram of a fourth sub-request in accordance with some embodiments.

FIG. 6, and the embodiments shown in FIG. 7, FIG. 8 and FIG. 9, illustrate timing and storage gains achieved by addressing data stored in "stripes" across a plurality of memory portions (e.g., data stripes across a set of die), as opposed to addressing individual "stripe units" of data (e.g., each data segment). A large burst of data can be minimally addressed and processed as it is written to memory. These timing and storage gains are even greater in multi-plane storage devices (e.g., TLC or EX3 memory). For example, as shown in FIG. 4, to write two pages of data (one per plane), to a particular page number in MLC memory, two sequences of an address-initializing instruction 402, 5-byte address 404 and data segment 406 are required in sub-request 400. In the case of TLC memory, three sequences would be required, and the time taken to transmit a set of requests to all the memory portions of a memory device will correspondingly increase.

In some embodiments, another advantage to addressing data on a stripe-basis, is an improvement in garbage collection and wear leveling across memory portions in a memory device. Writing data segments across all the memory portions of a memory device in parallel naturally provides more balanced wear, and mitigates the problem of reaching end-of-life of the device too soon. Further, the memory controller needs to keep track of only one set of program/erase cycle (P/E) values, with just one P/E value per stripe of blocks, for a package containing multiple memory die. For example, in a memory device having N flash memory die, each having B blocks (e.g., erase blocks), the memory controller keeps track of only B program/erase cycle values (one for each of B stripes of blocks), instead of NxB program/erase cycle values, and furthermore the only program/erase cycle values that the memory controller uses to determine which flash memory blocks to garbage collect and erase are the B program/erase cycle values for the B stripes of blocks. This results in reduced complexity in wear level management for the memory device, since each stripe of blocks across all the flash memory die in the memory device are treated as a single entity for purposes of wear leveling and garbage collection.

It is noted that while sub-request 600 is transmitted to the memory portions of one memory device, there may be one or more parallel sub-requests transmitted to the memory portions of other memory devices.

As explained below in more detail, in some embodiments all but one of the memory portions in a memory device are programmed to function as explained above, writing a respective data segment in response to a write sub-request sent to all memory portions of the memory device, while the remaining memory portion performs a different operation (e.g., XORing all the data segments stored by the other memory portions). In yet some other embodiments, a first subset of the memory portions in a memory device are programmed to function as explained above, writing a respective data segment in response to a write sub-request sent to all memory portions of the memory device, while a second subset of the memory portions perform a different operation.

FIG. 7 is a phase timing diagram of a second sub-request 700 in accordance with some embodiments. FIG. 7 illustrates a sub-request 700 including a first contiguous portion, instruction portion 714, and a second contiguous portion, data portion 716. In some embodiments, the instruction portion 714 includes a combination of addressing and programming instructions, such as instructions 702, 704, 706 and 708. In some embodiments, sub-request 700 includes one contiguous set of instructions followed or preceded by one contiguous set of data segments 712. In the example shown in FIG. 7, each data segment 712 consists of data less than or equal to one complete 8 kb page.

Sub-request 700 illustrates another stream-lined approach to data striping across memory portions of a memory device. Instruction portion 714 includes an all-die-select instruction 702 to instruct each memory portion to start reading sub-request 700 for data corresponding to that memory portion. This is followed by an address-initializing instruction 704 to instruct each memory portion that a single relative memory address 706 will follow. In exemplary sub-request 700, single relative memory address 706 is a 5-byte address to identify a plane, block and page within each memory portion (e.g., each die). In this example, single relative memory address 706 need not identify any specific die, and the value in a die portion (if any) of address 706 is ignored, as all-die-instruction 702 instructs every die in the memory device to receive the same instructions and addressing information.

In some embodiments, data segments 712 in data portion 716 are equally-sized and each contain less than or equal to one page's worth of data (e.g., 8 kb or less for an 8 kb page size). In the example shown in FIG. 7, a respective die writes the data in its associated data segment on one plane at the location determined by the single relative memory address 706. For example, the first data segment 712a is written to the physical location in die 0 of the memory package that receives sub-request 700. If the single relative memory address 706 specifies plane 0, for example, as part of the relative memory address, each data segment 712 is written to a page in plane 0 of the die corresponding to that data segment, where the page is identified by single relative memory address 706.

Sub-request 700 illustrates the use of memory portion markers 710 interspersed among data segments 712 (e.g., positioned before each data segment 712). In some embodiments, memory portion markers 710 are used to indicate the respective memory portion to which each data segment 712 is to be stored. As explained above, sub-request 700 is sent to all eight die of a package. Furthermore, in this example, die 2 of the package scans through data portion 716 of sub-request 700 until it detects memory portion marker 710c. In response to detecting memory portion marker 710c, die 2 stores data segment 712c. In some embodiments, memory portion markers 710 are also used to indicate when a respective memory portion should stop writing data to its memory. For example, when die 2 detects memory portion marker 710d, it responds to detecting marker 710d by stopping writing data to its memory.

In some embodiments, at least one memory portion in a memory device, is programmed to determine which data segment 712 in data portion 716 it is assigned to store, without the use of memory portion markers 710. For example, die 7 is programmed to recognize that it is the eighth die in a package and it is programmed to detect the eighth data segment 712h, to write to its memory.

FIG. 8 is a phase timing diagram of a third sub-request 800 in accordance with some embodiments. FIG. 8 illustrates a sub-request 800 including a first contiguous portion, instruction portion 814, and a second contiguous portion, data portion 816. In some embodiments, the instruction portion 814 includes a combination of addressing and programming instructions, such as instructions 802, 804, 806 and 808. In some embodiments, sub-request 800 includes one contiguous set of instructions followed or preceded by one contiguous set of data segments 812 and 813. In the example shown in FIG. 8, each data segment 812 consists of one complete 8 kb page, and each data segment 813 consists of less than 8 kb of data (i.e., less than an 8 kb page).

Sub-request 800 illustrates another streamlined approach to data striping across memory portions of a memory device, for use when the data division to be stored in a memory device having M memory portions is not an integer multiple of M pages. Instruction portion 814 includes an all-die-select instruction 802 to instruct each memory portion to start reading sub-request 800 for data corresponding to that memory portion. This is followed by an address-initializing instruction 804 to instruct each memory portion that a single relative memory address 806 will follow. In exemplary sub-request 800, single relative memory address 806 is a 5-byte address to identify a plane, block and page within each memory portion (e.g., each die). In this example, any identification of a die in single relative memory address 806 is ignored, as all-die-instruction 802 instructs each die to receive and process the same instructions.

In the embodiment shown in FIG. 8, data segments 812 are equally-sized and each contain one page's worth of data (e.g., for an 8 kb page size), and data segments 813 are not necessarily equally-sized, and furthermore each one contains less than one page's worth of data. In this example, a respective die writes the data in its associated data segments at two locations determined by the single relative memory address 806. For example, data segment 812a is written to plane 0 and data segment 813a is written to plane 1, at physical locations in die 0 identified by single relative memory address 806. In some embodiments, data segments are written to the first plane of a set of two or more planes, and in some embodiments, data segments are written to the last plane of a set of two or more planes.

Sub-request 800 illustrates the use of memory portion markers 810 interspersed among data segments 812 and 813 (e.g., one portion marker 810 positioned before each pair of data segments 812, 813). In some embodiments, memory portion markers 810 are used to indicate which data segments 812 and/or 813 are to be stored in a respective memory portion. For example, sub-request 800 is sent to all eight die of a package. In this example, die 3 scans through data portion 816 of sub-request 800 until it detects or reads memory portion marker 810d. In response to detecting memory portion marker 810d, die 3 stores data segment 812d and stores data segment 813d. In some embodiments, memory portion markers 810 are also used to indicate when a respective memory portion should stop writing data to its memory. In this example, die 3 detects or reads memory portion marker 810e, and in response to detecting marker 810e, stops writing data to its memory.

In some embodiments, at least one memory portion in a memory device is programmed to determine which data segments 812 and/or 813 in the data portion 816 it is assigned to store, without the use of memory portion markers 810, and without the use of individual memory addresses for each data segment (e.g., as shown in FIG. 4). For example, die 5 is programmed to recognize that it is the sixth die in a package and it is programmed to detect the sixth page-sized data segment 812f and the sixth non-page-sized data segment 813f, to write to its memory.

FIG. 9 is a phase timing diagram of a fourth sub-request 900 in accordance with some embodiments. FIG. 9 illustrates a sub-request 900 including a first contiguous portion, instruction portion 914, and a second contiguous portion, data portion 916. In some embodiments, the instruction portion 914 includes a combination of addressing and programming instructions, such as instructions 902, 904, 906, 908 and 910. In some embodiments, sub-request 900 includes one contiguous set of instructions followed or preceded by one contiguous set of data segments 912. In the example shown in FIG. 9, each data segment 912 is equally-sized and consists of two 8 kb pages or less of data.

Sub-request 900 illustrates another streamlined approach to data striping across memory portions of a memory device. Instruction portion 914 includes an all-die-select instruction 902 to instruct each memory portion to scan data portion 916 of sub-request 900 for data corresponding to that memory portion. This is followed by an address-initializing instruction 904 to instruct each memory portion that a single relative memory address 906 will follow. In exemplary sub-request 900, single relative memory address 906 is a 5-byte address to identify a plane, block and page within each memory portion (e.g., each die). In this example, any identification of a die in single relative memory address 906 is ignored, as all-die-instruction 902 instructs each die to receive and process the same instructions.

In the embodiment shown in FIG. 9, each data segment 912 is equally-sized and consists of two 8 kb pages or less of data. In this example, a respective die writes the data in its associated data segments at one or more locations determined by the single relative memory address 906. For example, if data segment 912b consists of 8 kb or less of data, it is written by die 1 to a single determined physical location, for example in plane 0, identified by single relative memory address 906. In another example, if data segment 912b consists of 12 kb of data, the first 8 kb of data is written to plane 0, and the remaining 4 kb is written to plane 1, at physical locations in those planes of die 1 identified by single relative memory address 906.

Contrary to the approaches shown in FIG. 7 and FIG. 8, sub-request 900 does not use memory portion markers to indicate to a respective memory portion of a memory device, which data segment to write to its memory. Sub-request 900 instead relies on the use of a segment mode enable instruction 910 to instruct each memory portion of the memory device to read and store its assigned data segment 912, of a predetermined size. In some embodiments, segment mode enable instruction 910 includes (i.e., specifies) the size of each equally-sized data segment 912. In some embodiments, at least one memory portion is programmed to detect which data segment 912 to store to its memory, for example by counting data segments, or counting data bytes (or other data units) until an offset position (e.g., byte position=4*12 kb, for die 4) in data portion 916 corresponding to the memory portion is reached.

Figure 10:
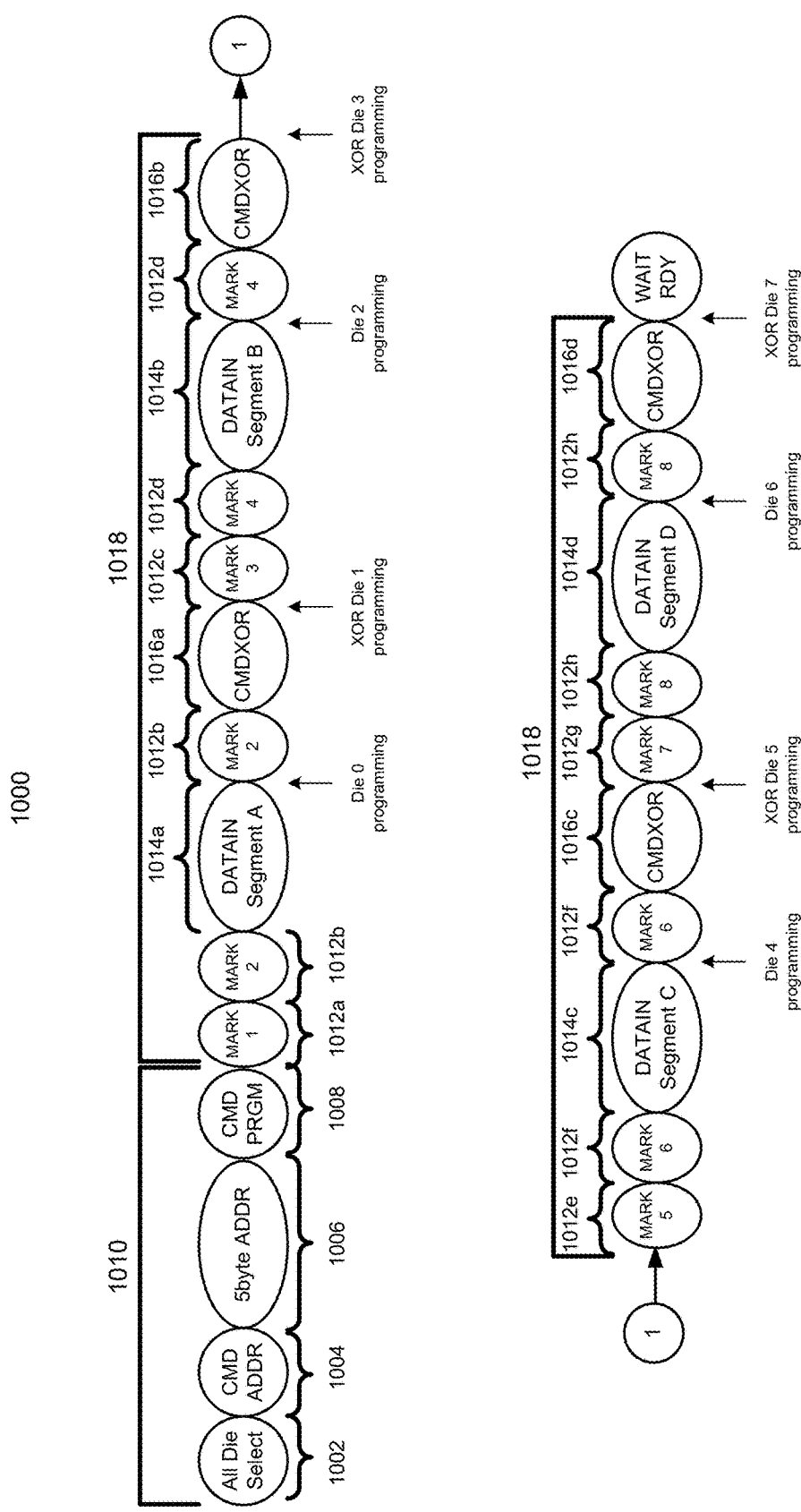
FIG. 10 is a phase timing diagram of an XOR sub-request in accordance with some embodiments.

FIG. 10 is a phase timing diagram of a first XOR sub-request 1000 in accordance with some embodiments. Exemplary XOR sub-request 1000 is used to back up data from data segments written to one or more memory portions of a memory device. In some embodiments, as shown in FIG. 10, half of the storage space in a memory device is dedicated to storing data and half of the storage space is dedicated to storing XOR or backup data. FIG. 10 illustrates a sub-request 1000 including a first contiguous portion, instruction portion 1010, and a second contiguous portion, data portion 1018. In some embodiments, the instruction portion 1010 includes a combination of addressing and programming instructions, such as instructions 1002, 1004, 1006 and 1008. In some embodiments, instruction portion 1010 includes an all-die-select instruction 1002 to instruct each memory portion to scan data portion 1018 of sub-request 1000 for the data portion or portions corresponding to that memory portion. This is followed by an address-initializing instruction 1004 to instruct each memory portion that a single relative memory address 1006 will follow. Programming instruction 1008 instructs one subset of the memory portions receiving sub-request 1000 to perform a write operation and instructs another subset of the memory portions receiving sub-request 1000 to perform an XOR operation. In some embodiments, XOR sub-request 1000 includes one contiguous set of instructions (e.g., instruction portion 1010) followed or preceded by one set of data segments 1014 and XOR instructions 1016 (e.g., data portion 1018).

Data portion 1018 optionally includes memory portion markers 1012, interspersed among data segments 1014 and XOR instructions 1016, to indicate which memory portions correspond to which data segments and to which XOR seed values. In the example in FIG. 10, memory portion markers 1012a and 1012b indicate that the following data segment 104a is to be stored in memory portion 0 and used as input to an XOR operation performed by memory portion 1, while the second occurrence of memory portion marker 1012b in data portion 1018 indicates that the following XOR instruction 1016a specifies the seed value to be used for generating the XOR value to be stored in memory portion 1.

In the example shown in FIG. 10, every even numbered die (e.g., die 0, 2, 4 and 6) stores a data segment and every odd numbered die (e.g., die 1, 3, 5 and 7) stores data corresponding to an XOR'ed value of the preceding data segment in sub-request 1000. In some embodiments, each XOR'ed value is derived by performing an XOR operation using a predetermined seed value. For example, in XOR sub-request 1000, data segment 1014a corresponds to data to be written to die 0, and XOR instruction 1016a corresponds to XOR data of data segment 1014a to be written to die 1.

In some embodiments, XOR instructions 1016 include a seed value to use for performing an XOR operation on a preceding data segment. For example, die 1 uses a seed value (e.g., a pseudo-random number) obtained from XOR instruction 1016a to perform an XOR operation on data segment 1014a. In some embodiments, a respective pre-defined seed value is stored on the one or more memory portions used to store XOR or backup data. In some embodiments, an XOR operation on a data segment is performed using address 1006 of XOR sub-request 1000. For example, the predefined seed value is single relative memory address 1006, specifically, or is a result of a predefined operation on single relative memory address 1006. In some embodiments, the predefined seed value is pre-loaded onto each memory portion and in some embodiments, each memory portion of the plurality of memory portions uses the same predefined seed value. In some embodiments, a predefined seed value stored in a memory portion is derived from a data segment. For example, the predefined seed value for die 1 is derived from the first and/or last X bytes of data segment 1014a.

In some alternative embodiments, an XOR sub-request includes an instruction portion 1010 as shown in FIG. 10, and includes a data portion that includes only a sequence of data segments without any memory portion markers 1012 and without any XOR instructions 1016. In these embodiments, command 1008 specifies or otherwise indicates which memory portions are to store data from data portion 1018 and which memory portion or portion are to generate and store XOR values. In a first example, command 1008 specifies that memory portions 0 to N−1 are to store N data segments 1014 in data portion 1018, and that memory portion N is to generate and store an XOR of data segments 0 to N−1. In a second example, command 1008 specifies that even numbered memory portions 0, 2, 4, etc. are to store corresponding data segments 1014 in data portion 1018, and that even numbered memory portions are to generate and store XOR values in accordance with predefined criteria (e.g., using a seed value specified by command 1008, or a predefined seed value, or a seed value previously stored in the odd numbered memory portions, etc.).

Figure 11A:
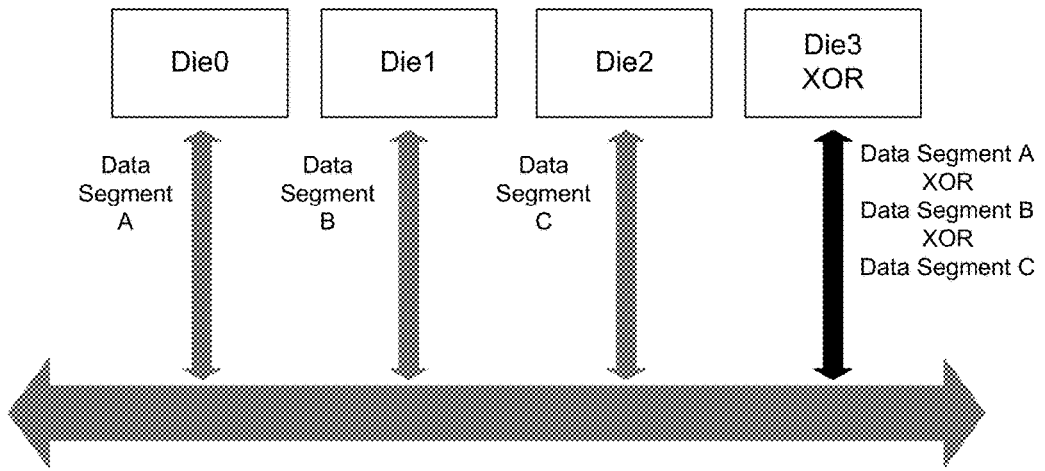
FIG. 11A is a diagram of a first proposed XOR sub-request processing architecture in accordance with some embodiments.

FIG. 11A is a diagram of a first XOR sub-request processing architecture in accordance with some embodiments. FIG. 11A illustrates that in some embodiments, the one or more XOR instructions of an XOR sub-request includes an instruction for a particular memory portion of the M memory portions in a memory device to generate an XOR of N data segments (where N is greater than one), and to store the resulting XOR value in the particular memory portion. For example, as shown in FIG. 11A, one memory portion (die3) stores the generated XOR of the preceding data segments stored to the preceding memory portions (e.g., die0, die1 and die2). In this example, the generated XOR value is derived by performing sequential XOR operations on the N data segments, for example: (data segment A XOR data segment B) XOR data segment C. FIG. 11A illustrates that one or more memory portions (e.g., die) of the memory device (e.g., package) saves the XOR operation result of respective bytes on all other memory portions. For example, for every byte position I in the generated XOR value, the $I^{th}$ byte of the generated XOR value is generated by XORing the $I^{th}$ byte stored to all the other memory portions in the same memory device (e.g., package). In the case of failure of any of the memory portions in the memory device, other than the XOR memory portion, the XOR memory portion is used to recover data from the failed memory portion by XORing the corresponding XOR value in the XOR memory portion with corresponding data values read from the other memory portions (excluding the failed memory portion).

Figure 11B:
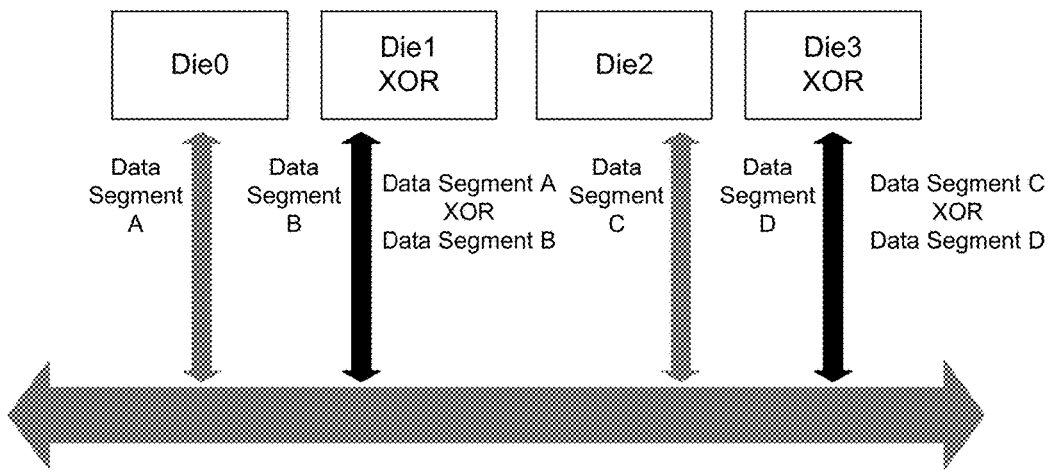
FIG. 11B is a diagram of a second proposed XOR sub-request processing architecture in accordance with some embodiments.
Figure 12A:
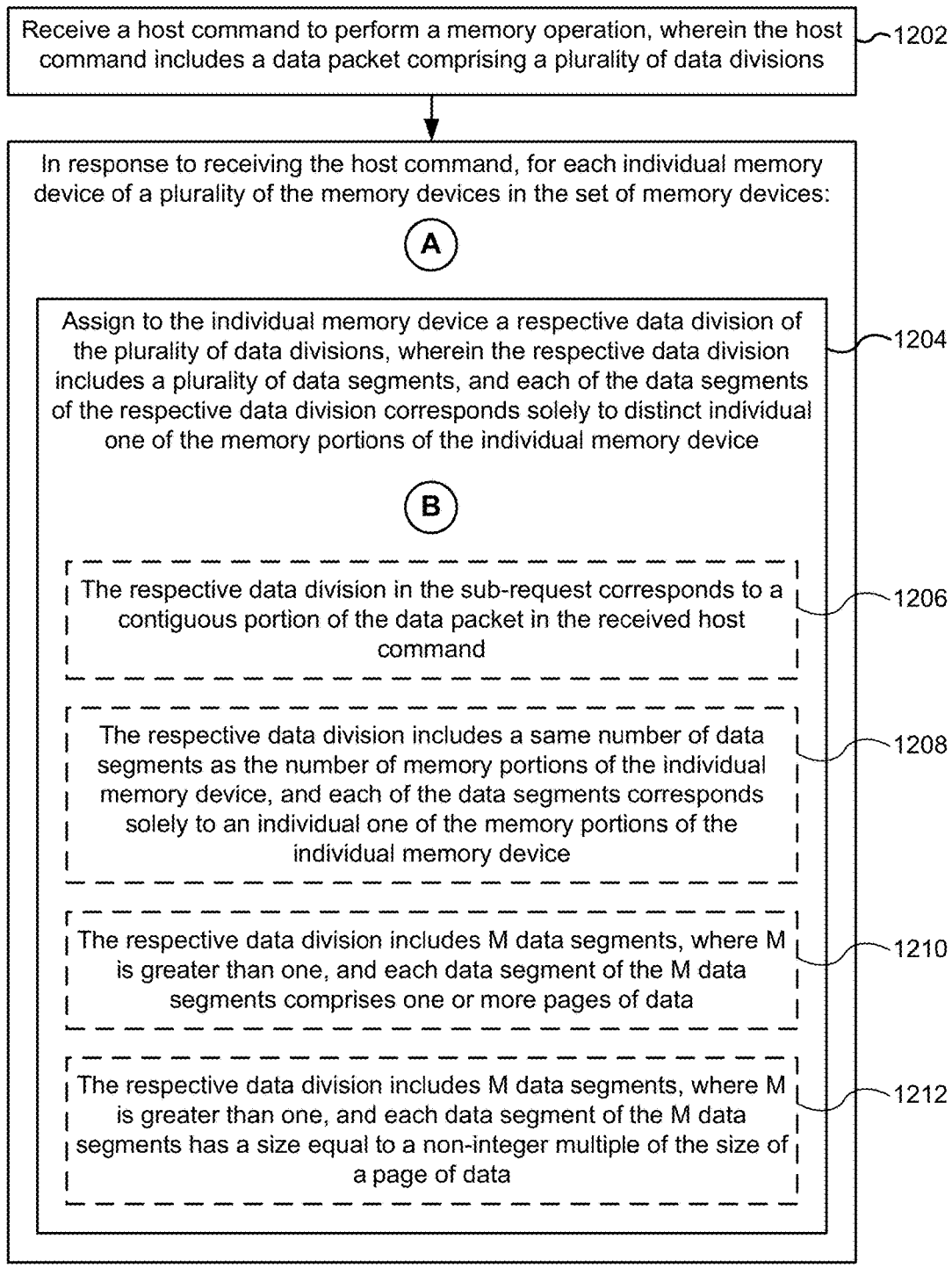
FIGS. 12A-12C illustrate a flowchart representation of a method of performing data striping at a storage controller in accordance with some embodiments.
Figure 12B:
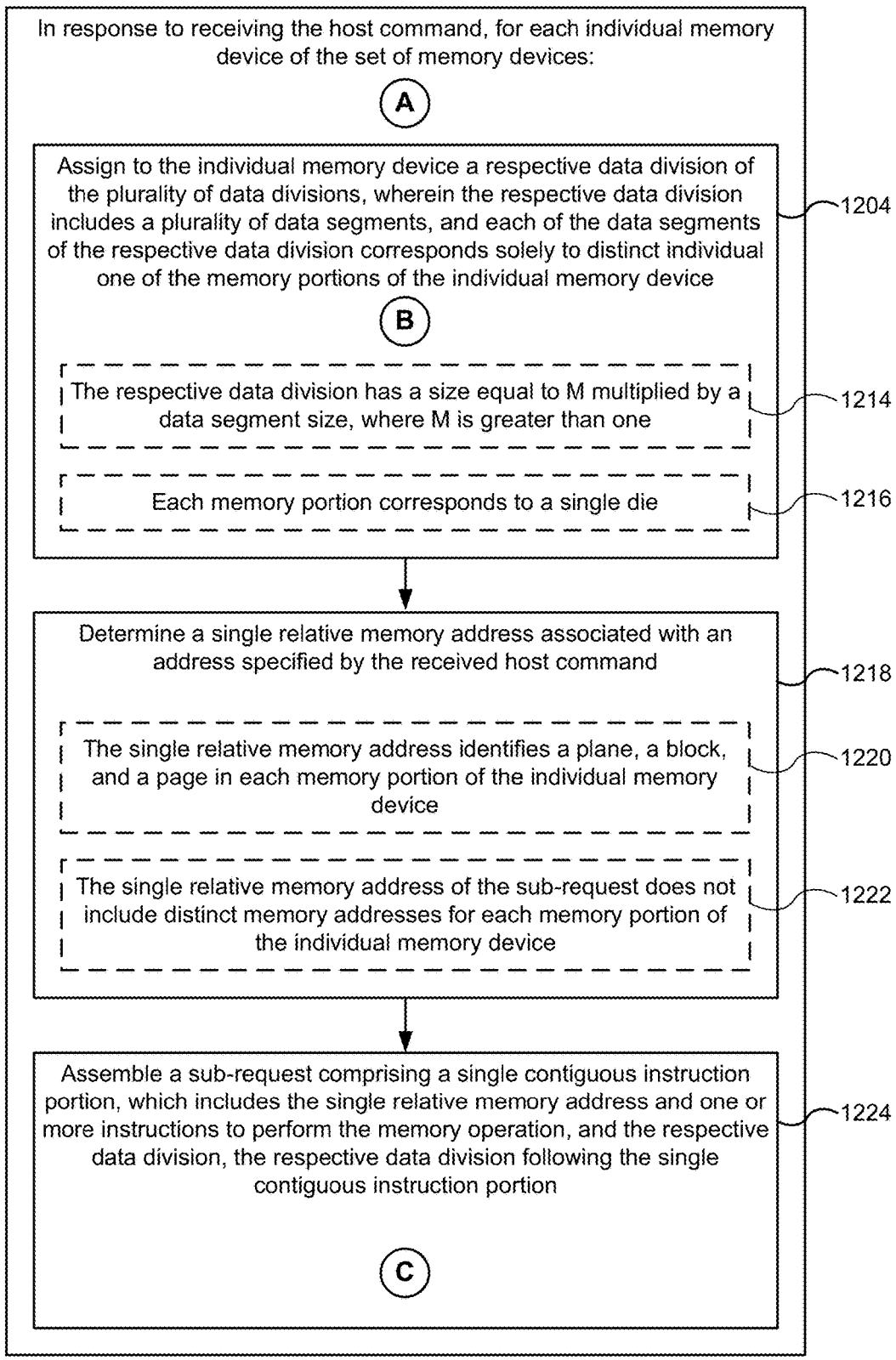
Figure 12C:
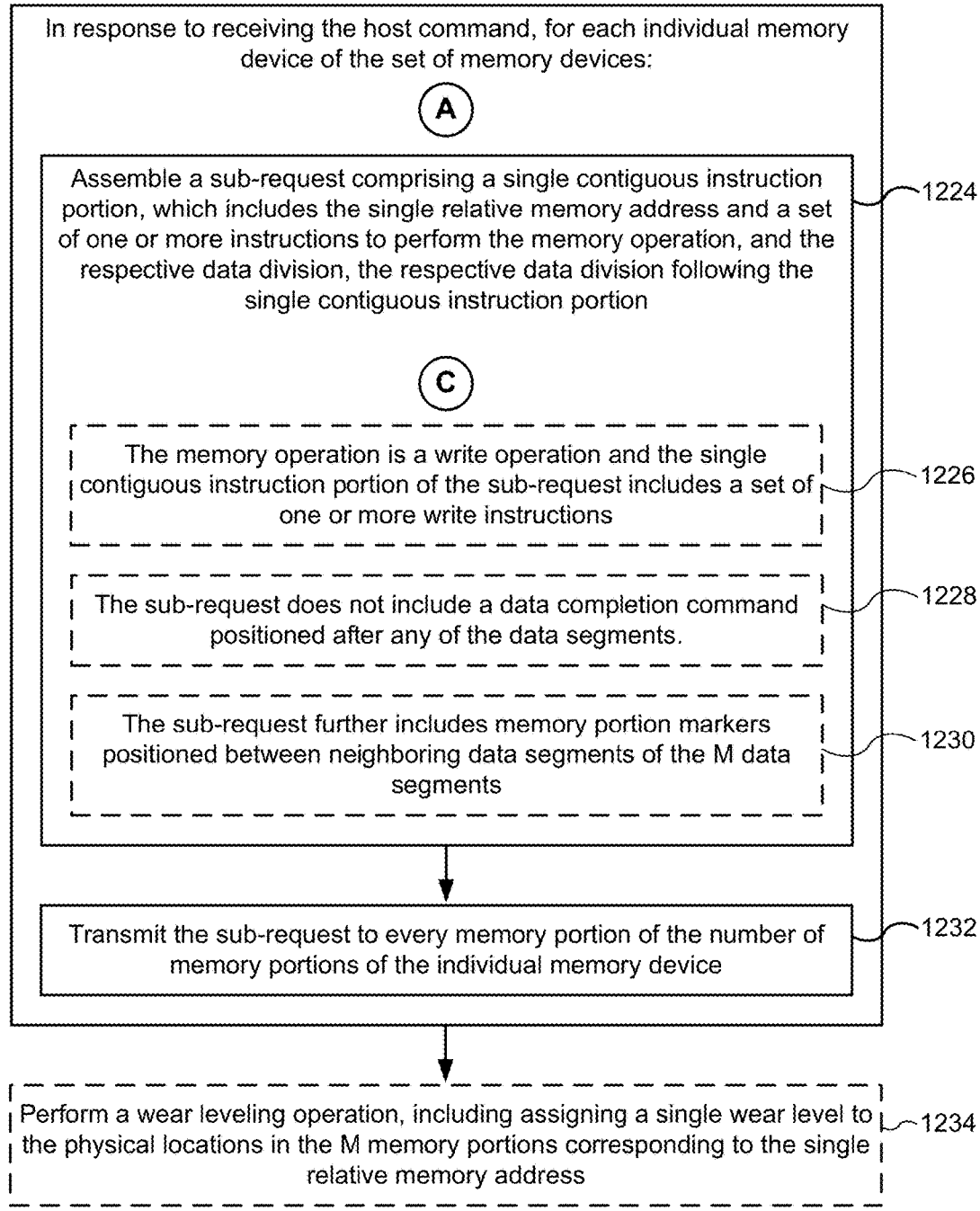
Figure 13A:
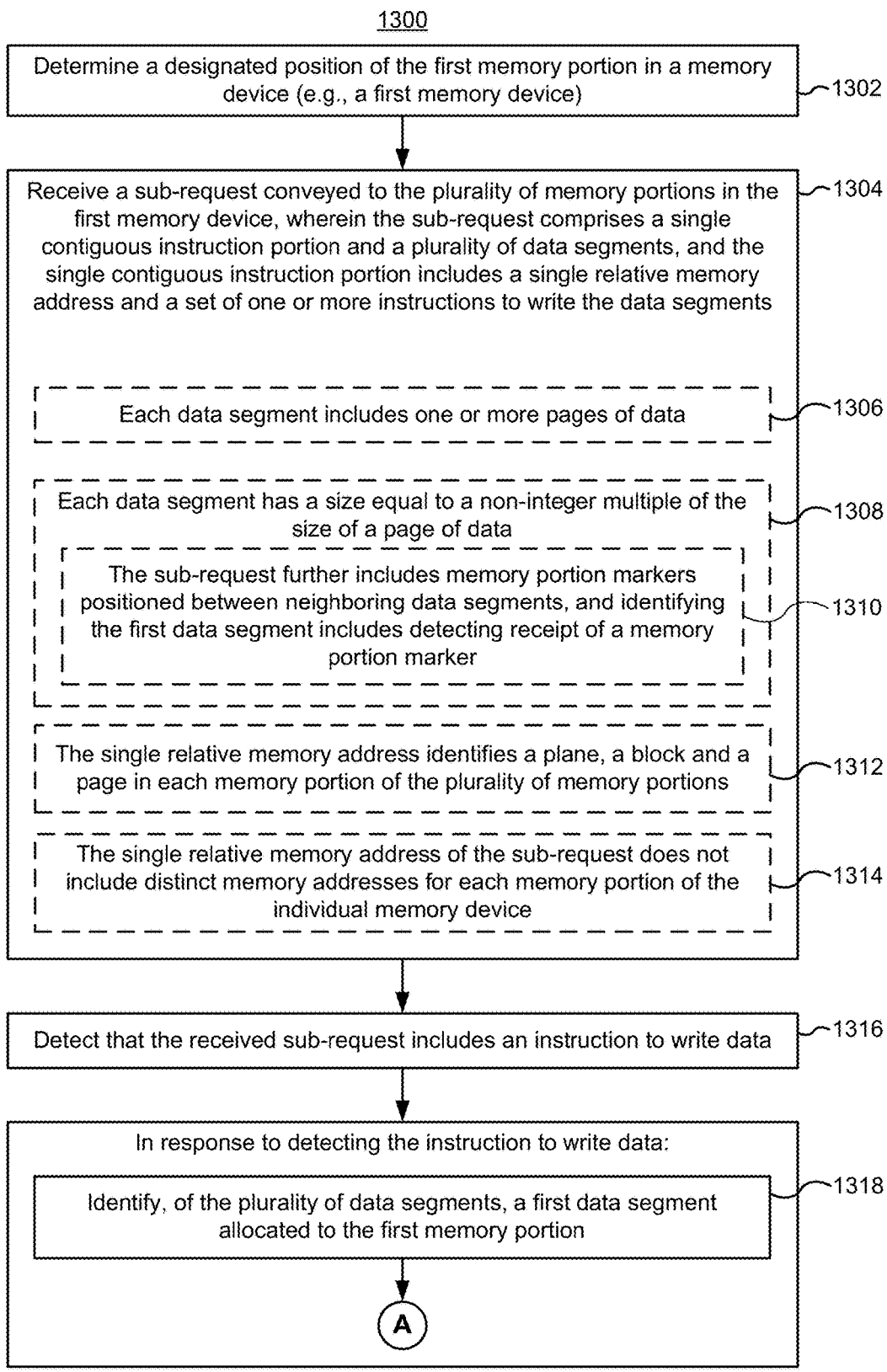
FIGS. 13A-13B illustrate a flowchart representation of a method of performing data striping at a memory portion in accordance with some embodiments.
Figure 13B:
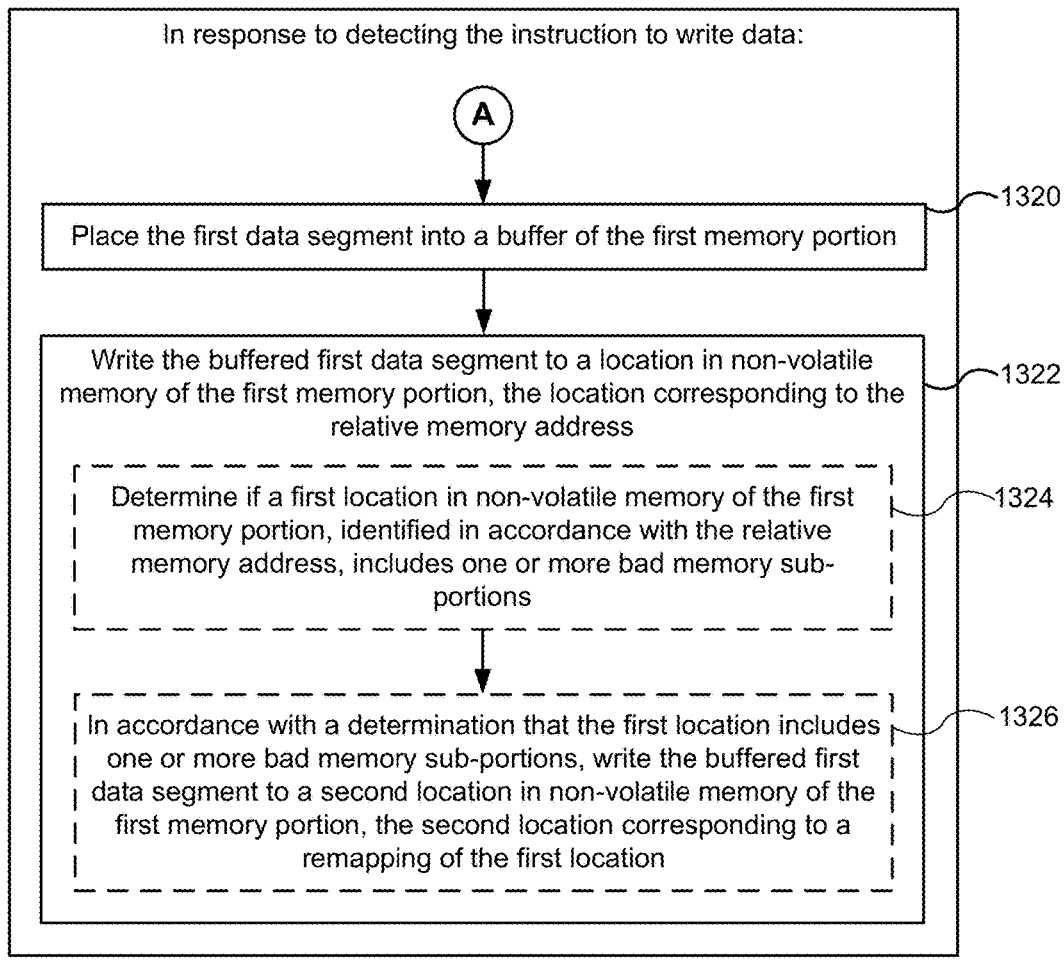

FIG. 11B is a diagram of a second XOR sub-request processing architecture in accordance with some embodiments. In some embodiments, the one or more XOR instructions of an XOR sub-request includes an instruction for each memory portion of two or more of the M memory portions in a memory device to generate an XOR of a particular pair of N data segments (where N is greater than one), and to store the resulting XOR value in the particular memory portion. For example, as shown in FIG. 11B, an XOR value is generated from a first data segment (e.g., data segment A written to die0) and a second data segment (e.g., data segment B written to die1, or a seed value), and the XOR value is stored in die1. In some embodiments, the one or more memory portions storing XOR values do not store any of the data segments specified by the XOR sub-request and instead store only XOR values.

FIG. 12 illustrates a flowchart representation of a method 1200 of performing data striping at a storage controller in accordance with some embodiments. The method is performed in a storage system (e.g., storage system 100, FIG. 1), the storage system having one or more memory controllers (e.g., memory controller 120, FIG. 1) and a set of memory devices (e.g., storage device 130, FIG. 1). Each memory device comprises a number, greater than one, of memory portions (e.g., memory portions 131, FIG. 1). In some embodiments, the storage system includes one or more three-dimensional (3D) memory devices, each with a 3D array of memory cells, and circuitry associated with operation of memory elements in the one or more 3D memory devices. In some embodiments, the circuitry and one or more memory elements in a respective 3D memory device, of the one or more 3D memory devices, are on the same substrate.

A memory controller of the storage system receives (1202) a host command to perform a memory operation, where the host command includes a data packet comprising a plurality of data divisions. For example, the host command includes a command to write the data in a data packet to non-volatile memory of the storage system. In this example, the data packet includes sub-sets of data that are called data divisions. In some embodiments, one data division of the plurality of data divisions corresponds to one memory device (e.g., a memory package). In some embodiments or in some circumstances, each data division of the plurality of data divisions is equally-sized. However, in some other embodiments or in some circumstances, the data packet is divided into D data divisions, where D is an integer. When D is greater than one, the first D−1 of the data divisions each has a predefined size (e.g., equal to a predefined number of pages multiplied by the number of memory portions in the memory device in which the data division will be stored), and the last data division has the remaining data of the data packet and has a size no greater than the predefined size.

In response to receiving the host command, for each individual memory device of a plurality of the memory devices in the set of memory devices, the memory controller assigns (1204) to the individual memory device a respective data division of the plurality of data divisions. For example, if the received data packet has four data divisions, four of the memory devices in the storage system are each assigned a respective data division of the four data divisions. In some embodiments, the number of data divisions in the received data packet does not necessarily equal the number of memory devices in the storage system. Thus, any particular received data packet can have fewer data divisions that there are memory devices, or more data divisions than there are memory devices. But in some circumstances a received data packet will have the same number of data divisions as there are memory devices in the storage system.

The respective data division assigned to an individual memory device includes a plurality of data segments, and each of the data segments of the respective data division corresponds solely to a distinct individual one of the memory portions of the individual memory device. For example, in response to receiving the host command, the memory controller, in a system containing four memory packages, assigns a portion of data in the received data packet (i.e., a data division), to a first memory package. In this example, the first memory package contains eight die, and the data division contains eight data segments, where each data segment corresponds to a distinct die. In some embodiments, each data segment of a data division is equally-sized. For purposes of explaining method 1200, it is assumed that the received data packet includes a plurality of data divisions. However, it should be understood that in some circumstances, a received data packet will have only a single data division.

In some embodiments, the respective data division (1206) in the sub-request corresponds to a contiguous portion of the data packet in the received host command. For example, as shown in FIG. 5B, data division 513 is the first of four data divisions of data packet D. In this example, each of the data divisions corresponds to and includes a distinct, non-overlapping contiguous portion of the data in data packet D. In some embodiments, the data division includes a contiguous portion of the data packet, but also includes additional information such as error correction information and/or metadata.

In some embodiments, the respective data division includes (1208) a same number of data segments as the number of memory portions of the individual memory device, and each of the data segments corresponds solely to an individual one of the memory portions of the individual memory device. In some embodiments, the respective data division includes (1210) M data segments, where M is an integer greater than one, and each data segment of the M data segments comprises one or more pages of data. In some embodiments, the number of data segments, M, is equal to the number of memory portions, N, but in some embodiments the number of data segments is equal to N−1, N/2, or another number less than N.

In some embodiments, the respective data division includes (1212) M data segments, where M is greater than one, and each data segment of the M data segments has a size equal to a non-integer multiple of the size of a page of data. For example, each data segment has a size smaller than a page of data, or alternatively has a size greater than one page of data and less than two pages of data. In some embodiments, the respective data division (1214) has a size equal to M multiplied by a data segment size, where M is an integer greater than one. In some embodiments, each memory portion (1216) corresponds to a single die.

In response to receiving the host command, for each individual memory device of the set of memory devices, the memory controller determines (1218) a single relative memory address associated with an address specified by the received host command. As explained above with reference to FIG. 5, in some embodiments, the single relative memory address is an offset value. For example, in some embodiments the single relative memory address 606 is an offset value, that identifies a block and a page number within each memory portion (e.g., flash memory die) in the individual memory device, and in other examples is another subset of a complete physical memory address. In some embodiments, the single relative memory address specifies or corresponds to the same physical memory address within each memory portion (e.g., the same local physical address, indicating the same block B and page P, within each flash memory die in the memory device).

In some embodiments, the single relative memory address identifies (1220) a plane, a block and a page in each memory portion of the individual memory device. In some embodiments, the single relative memory address of the sub-request does not include (1222) distinct memory addresses for each memory portion of the individual memory device. For example, single relative memory address 606 of sub-request 600 in FIG. 6 does not include distinct memory addresses for each data segment of memory portion.

Further in response to receiving the host command, for each individual memory device of the set of memory devices, the memory controller assembles (1224) a sub-request comprising a single contiguous instruction portion, which includes the single relative memory address and a set of one or more instructions to perform the memory operation, and the respective data division, the respective data division following the single contiguous instruction portion. For example, sub-request 600 in FIG. 6 illustrates a sub-request comprising instruction portion 612, which includes single relative memory address 606 and a set of instructions, and data segments 610 of a particular data division 614.

In some embodiments, the memory operation is (1226) a write operation and the single contiguous instruction portion of the sub-request includes a set of one or more write instructions. For example, programming instructions 608, 708, 808 and 908 in FIGS. 6-9 include one or more write instructions for writing data segments to memory. In some embodiments, the memory operation is a read operation and the sub-request includes a single contiguous set of one or more read instructions. In some embodiments, if the memory operation is a read operation, the single contiguous instruction portion of the sub-request includes a single relative memory address, but does not include one or more data segments or a data division. In this case, the single read sub-request is still broadcast to each memory portion, and each memory portion retrieves corresponding data (e.g., a page of data, two pages of data, less than a page of data) from its storage space and loads the corresponding data into a buffer (e.g., data buffer 133, FIG. 1). In some embodiments, the buffered contents are received from each memory portion in a fixed order (e.g., from die 0 to die M−1), or selectively from each memory portion using memory portion markers.

In some embodiments, the memory operation is an erase operation and the single contiguous instruction portion of the sub-request includes a set of one or more read instructions and a single relative memory address, but does not include one or more data segments or a data division. In this case, the single erase sub-request is still broadcast to each memory portion, and each memory portion erases the data corresponding to the single relative memory address received in the sub-request.

In some embodiments, as shown in FIG. 6, the sub-request 600 does not include (1228) a data completion command positioned after any of the data segments 610 in data portion 614 of the sub-request, and instead all commands in the sub-request are positioned in the sub-request before the data segments 610 in data portion 614. The command or commands in the instruction portion 612 directly or indirectly indicate the segment size of the data segments 610, and instead of having a data completion command positioned to indicate the end of each data segment 610, each of the memory portion in the memory device is responsible for determining the beginning and end of the data segment to be written in that memory portion.

In some embodiments or in some circumstances, the sub-request further includes (1230) memory portion markers positioned between neighboring data segments of the M data segments. For example, the sub-request includes M−1 memory portion markers between the M data segments, where the memory portion markers are not instructions to perform memory operations. In another example, the sub-request includes a memory portion marker before each of the M data segments in the data portion of the sub-request. The example shown in FIG. 7 illustrates the use of eight memory portion markers, each positioned before a corresponding data segment of eight data segments, including marker 710a at the start of data portion 716. In some embodiments, memory portion markers are used to indicate which data segment is to be stored in respective memory portion. For example, as shown in FIG. 7, sub-request 700 is sent to all eight die of a package, and die 2 reads through sub-request 700 until it detects or reads memory portion marker 710c. In response to detecting memory portion marker 710c, die 2 stores data segment 712c. In some embodiments, memory portion markers 710 are also used to indicate when a respective memory portion should stop writing data to its memory.

Further in response to receiving the host command, for each individual memory device of the set of memory devices, the memory controller transmits (1232) the sub-request (for that individual memory device) to every memory portion of the number of memory portions of the individual memory device.

In some embodiments, the memory controller performs (1234) a wear leveling operation, including assigning a single wear level to the physical locations in the M memory portions corresponding to the single relative memory address. As a result, the wear leveling operation treats each stripe of physical locations across the M memory portions (e.g., M flash memory die), in a memory device as a single entity for purposes of wear leveling. The memory locations in each stripe of physical locations all correspond to a single shared relative memory address. In one example, each stripe in a memory device is specified by a plane, block and page offset from the base physical memory address for each die in a memory device.

FIG. 13 illustrates a flowchart representation of a method 1300 of performing memory operations at a particular memory portion (herein called the first memory portion) in a memory device, in a storage system having a set of such memory devices, in accordance with some embodiments. The method is performed in a storage system (e.g., storage system 100, FIG. 1), the storage system having one or more memory controllers (e.g., memory controller 120, FIG. 1) and a set of memory devices (e.g., storage device 130, FIG. 1). Each memory device includes a number, greater than one, of memory portions (e.g., memory portions 131, FIG. 1). In some embodiments, the storage system includes one or more three-dimensional (3D) memory devices, each with a 3D array of memory cells, and circuitry associated with operation of memory elements in the one or more 3D memory devices. In some embodiments, the circuitry and one or more memory elements in a respective 3D memory device, of the one or more 3D memory devices, are on the same substrate.

A first memory portion (e.g., a first die) of the plurality of memory portions in a memory device determines (1302) a designated position of the first memory portion in the memory device. For example, the first memory portion is die4 in FIG. 6, and die4 determines that it is the fifth die in a set of five or more die in a memory device. In some embodiments, the first memory portion determines its relative designated position among the plurality of memory portions (e.g., die4 determines that it is the fifth die out of eight die). In some embodiments, the first memory portion determines its designated position without determining its relative designated position among the plurality of memory portions, or without determining how many memory portions are in the plurality of memory portions. For example, die4 determines that it is the fifth die, but does not determine that there are eight die in the same package (memory device) in which die4 is located.

The first memory portion receives (1304) a sub-request, which includes a single contiguous instruction portion and a plurality of data segments of a data packet, in accordance with a host command. The single contiguous instruction portion includes a single relative memory address and a set of one or more instructions to write the data segments. Typically, the data segments are received following the instruction portion of the sub-request. For example, in FIG. 6, sub-request 600 is sent to all eight die of a particular package, including die4, the first memory portion. Sub-request 600 includes instruction portion 612, which includes single relative memory address 606 and a set of one or more instructions to write data segments 610 of data portion 614.

In some embodiments, each data segment includes (1306) one or more pages of data. The example shown in FIG. 6 portrays data segments 610 each having two pages of data. In some embodiments or in some circumstances, each data segment has (1308) a size equal to a non-integer multiple of the size of a page of data. For example, as shown in FIG. 9, each data segment 912 has a predefined size which can include a size equal to a non-integer multiple of the size of a page of data (e.g., data segment 912a is 12 kb, whereas a page is 8 kb). The example shown in FIG. 8 shows two data segments 812 and 813 assigned to each memory portion, but in some embodiments data segments 812 and 813 are considered to be one data segment. In some embodiments, as shown in FIG. 8, the sub-request further comprises (1310) memory portion markers positioned between neighboring data segments, and identifying the first data segment includes detecting receipt of a memory portion marker.

In some embodiments, the single relative memory address identifies (1312) a plane, a block and a page in each memory portion of the plurality of memory portions. In some embodiments, the single relative memory address of the sub-request does not include (1314) distinct memory addresses for each memory portion of the memory device that includes the first memory portion. For example, single relative memory address 606 in FIG. 6 is one address identifying the same block and page number in each of the eight die of a package.

The first memory portion detects (1316) that the received sub-request includes an instruction to write data. For example, programming instruction 608 in sub-request 600 in FIG. 6 instructs every memory portion receiving sub-request 600 to write data. In this example, first memory portion die4 detects the instruction to write data within instruction 608.

In response to detecting the instruction to write data, the first memory portion identifies (1318), of the plurality of data segments, a first data segment allocated to the first memory portion. In FIG. 6, first memory portion die4 is the fifth die in the package, and therefore identifies that the fifth data segment, 610e, within data portion 614 is allocated for die4.

The first memory portion also places (1320) the first data segment into a buffer (e.g., data buffer 133, FIG. 1) for the first memory portion. In some embodiments, each memory portion has a buffer for temporarily storing incoming and outgoing data segments. The first memory portion writes (1322) the buffered first data segment to a location in non-volatile memory of the first memory portion, the location corresponding to the relative memory address.

In some embodiments, the first memory portion determines (1324) if a first location in non-volatile memory of the first memory portion, identified in accordance with the relative memory address, includes one or more bad memory sub-portions. In some embodiments, in accordance with a determination that the first location includes one or more bad memory sub-portions, the first memory portion writes (1326) the buffered first data segment to a second location in non-volatile memory of the first memory portion, the second location corresponding to a remapping of the first location. In some embodiments, in accordance with a determination that the first location does not include any bad memory sub-portions, the first memory portion writes the buffered first data segment to the first location.

In some embodiments, a memory portion will remap a bad memory sub-portion internally with a good memory sub-portion, if the bad portion was already determined to be bad before the memory portion received a sub-request. In some embodiments, a memory portion will add a sub-portion detected to be bad, into an internally stored bad memory sub-portion list and will automatically remap its location to that of a known good sub-portion. In some embodiments, the buffered data segment will automatically write to the remapped second sub-portion inside a memory portion without waiting for a determination of whether or not the data segment is being written to a location with any bad memory sub-portions.

Figure 14A:
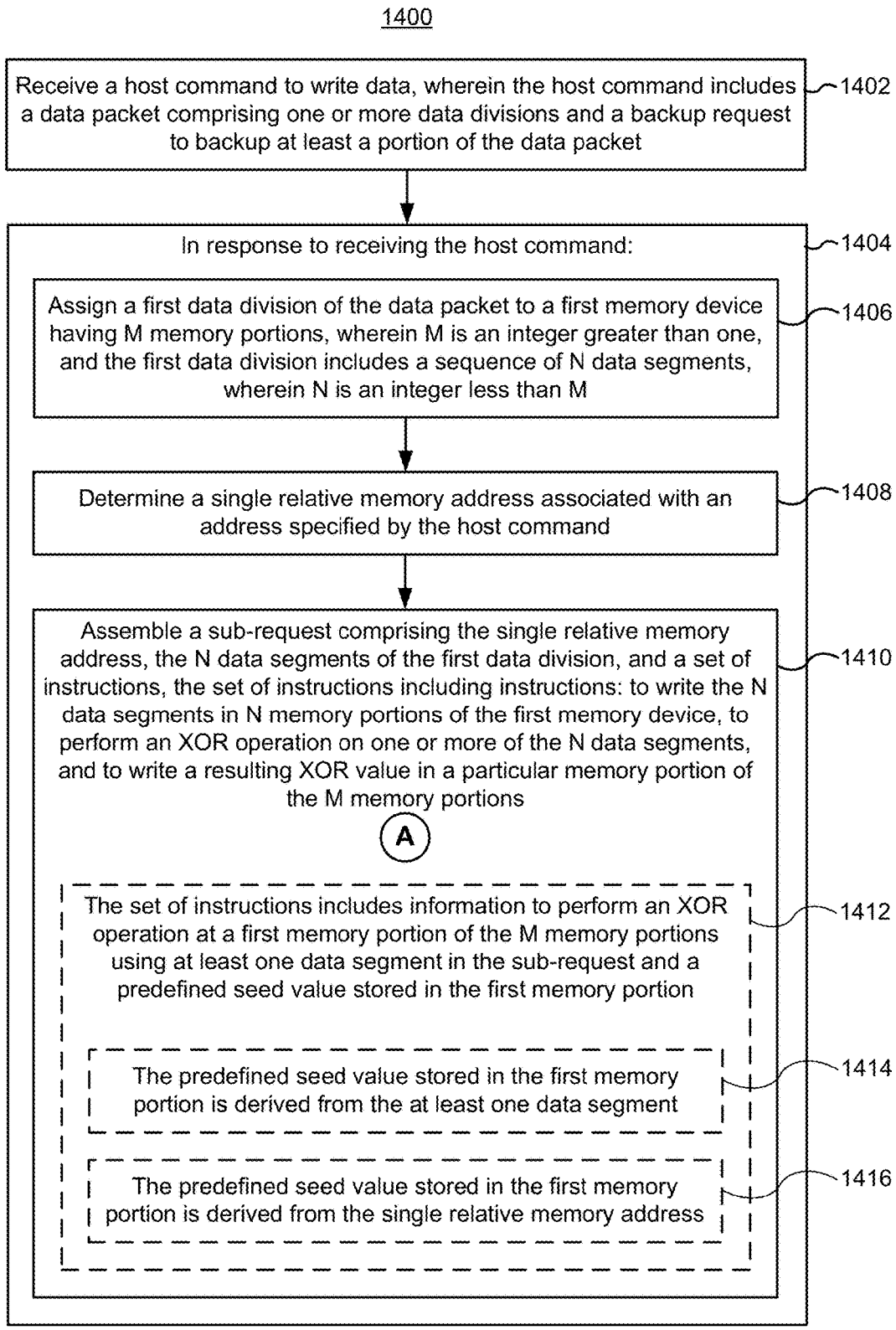
FIGS. 14A-14B illustrate a flowchart representation of a method of backing up data at a memory controller in accordance with some embodiments.
Figure 14B:
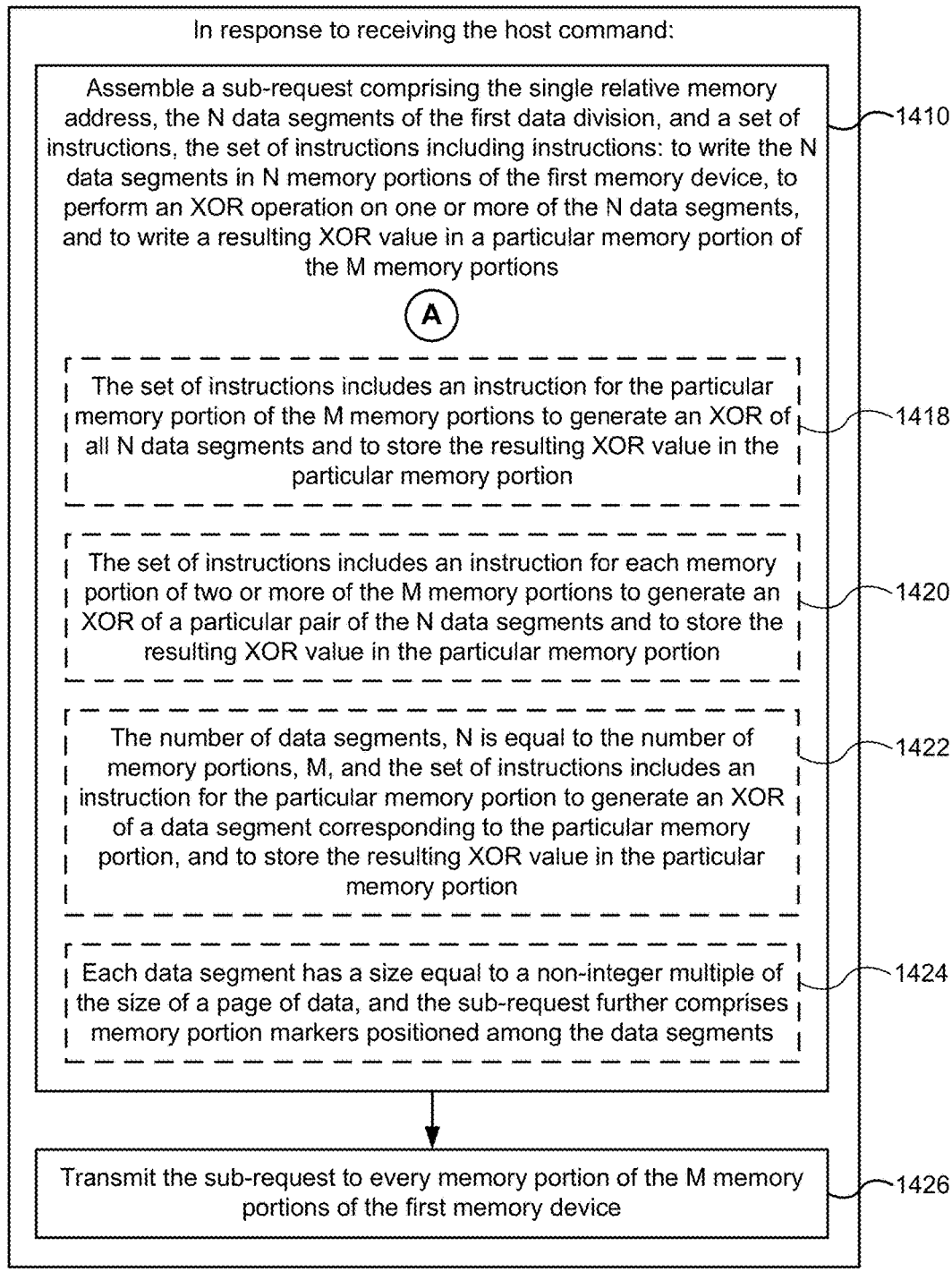

FIGS. 14A-14B illustrate a flowchart representation of a method of backing up data in a storage system in accordance with some embodiments. The method is performed in a storage system (e.g., storage system 100, FIG. 1), the storage system having one or more memory controllers (e.g., memory controller 120, FIG. 1) and a set of memory devices (e.g., storage device 130, FIG. 1). Each memory device comprises a plurality of memory portions (e.g., memory portions 131, FIG. 1). In some embodiments, the storage system comprises one or more three-dimensional (3D) memory devices, each with a 3D array of memory cells, and circuitry associated with operation of memory elements in the one or more 3D memory devices. In some embodiments, the circuitry and one or more memory elements in a respective 3D memory device, of the one or more 3D memory devices, are on the same substrate.

The memory controller receives (1402) a host command to write data, where the host command includes a data packet that includes one or more data divisions. Optionally, in some embodiments, the host command includes a backup request to backup at least a portion of the data packet. However, in other embodiments, the received host command does not include a data backup request, and instead received write data is backed up automatically, without having to receive a backup request from a host system.

In response to receiving the host command (1404), the memory controller assigns (1406) a first data division of the data packet to a first memory device having M memory portions, where M is an integer greater than one, and the first data division includes a sequence of N data segments, where N is an integer less than M. For example, for RAID stripe implementations, N=M−1, in which case there is one more memory portion than the number of data segments in the first data division. In some embodiments, N=M/2, to allow for a one-to-one backup of every data segment.

The memory controller determines (1408) a single relative memory address associated with (an address specified by) the host command. Various embodiments of the single relative memory address are discussed above with reference to FIG. 5.

The memory controller assembles (1410) a sub-request comprising the single relative memory address, the N data segments of the first data division, a set of one or more instructions to write the N data segments in N memory portions of the first memory device, perform an XOR operation on one or more of the N data segments, and to write a resulting XOR value in a particular memory portion of the M memory portions in the first memory device. For example, as shown in FIG. 10, sub-request 1000 includes single relative memory address 1006 and four data segments 1014. Sub-request 1000 also includes a set of instructions such as programming instruction 1008 indicating to die 0, die 2, die 4 and die 6 to write corresponding data segments to their memory, and XOR instructions 1016 to indicate to die 1, die 3, die 5 and die 7 to perform an XOR operation on a respective data segment (e.g., the data segment preceding each XOR instruction) in the sub-request. In this example, the resulting XOR values are stored in die 1, die 3, die 5 and die 7, respectively.

In some embodiments, the one or more XOR instructions includes (1412) information to perform an XOR operation at a first memory portion of the M memory portions using at least one data segment in the sub-request and a predefined seed value stored in the first memory portion. In some embodiments, the predefined seed value stored (1414) in the first memory portion is derived from the at least one data segment. For example, the predefined seed value is derived from the first and/or last X bytes of the at least one data segment. In some embodiments, the predefined seed value stored (1416) in the first memory portion is derived from the single relative memory address. For example, the predefined seed value is the 5-byte or 3-byte address, specifically, or is a result of a predefined operation on the single relative memory address. In some embodiments, the predefined seed value is pre-loaded onto each memory portion that is to perform an XOR operation, and in some embodiments, each memory portion that is to perform an XOR operation uses the same predefined seed value.

In some embodiments, the set of instructions includes an instruction (1418) for the particular memory portion of the M memory portions to generate an XOR of all N data segments and to store the resulting XOR value in the particular memory portion. For example, as shown in FIG. 11A, one memory portion (die3) stores the generated XOR of the preceding data segments stored to the preceding memory portions (e.g., die0, die1 and die2).

In some embodiments, the one or more XOR instructions includes (1420) an instruction for each memory portion of two or more of the M memory portions to generate an XOR of a particular pair of the N data segments and to store the resulting XOR value in the particular memory portion. For example, as shown in FIG. 11B, an XOR value is generated of a first data segment (e.g., the data segment written to die0) and a second data segment (e.g., the data segment written to die1), and the XOR value is stored in die1. In some embodiments, the memory portion storing the XOR value does not store any of the N data segments.

In some embodiments, the number of data segments, N is equal to the number of memory portions, M, and the set of instructions includes (1422) an instruction for the particular memory portion to generate an XOR of a data segment corresponding to the particular memory portion, and to store the resulting XOR value in the particular memory portion. For example, in a given storage system, a memory device (e.g., a package) contains eight memory portions (e.g., eight die) and a sub-request is sent to the eight memory portions containing eight data segments. In this example, an XOR value is generated for each data segment (e.g., eight XOR values are generated), and each XOR value is stored in the same memory portion as its corresponding data segment (e.g., the fourth data segment is stored in the fourth die, and the XOR value of the fourth data segment is also stored in the fourth die).

In some embodiments, each data segment has (1424) a size equal to a non-integer multiple of the size of a page of data, and the sub-request further comprises memory portion markers positioned among the data segments. For example, as shown in FIG. 10, sub-request 1000 has a plurality of memory portion markers 1012, interspersed among data segments 1014 and XOR instructions 1016. In some embodiments, memory portion markers in the sub-request are used to indicate which data segment is to be stored for a respective memory portion, and/or which XOR value is to be stored for a respective memory portion.

The memory controller transmits (1426) the sub-request to every memory portion of the M memory portions of the first memory device.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three-dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions descried and claimed herein are not limited to the two dimensional and three-dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first trigger condition could be termed a second trigger condition, and, similarly, a second trigger condition could be termed a first trigger condition, without changing the meaning of the description, so long as all occurrences of the "first trigger condition" are renamed consistently and all occurrences of the "second trigger condition" are renamed consistently. The first trigger condition and the second trigger condition are both trigger conditions, but they are not the same trigger condition.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of performing memory operations in a storage system, the storage system having one or more memory controllers and a set of memory devices, each memory device comprising a plurality of memory portions, the method comprising:
    at a memory controller:
        in response to receiving a host command to write data, wherein the host command includes a data packet comprising one or more data divisions and a backup request to backup at least a portion of the data packet:
            assigning a first data division of the data packet to a first memory device having M memory portions, wherein M is an integer greater than one, and the first data division includes a sequence of N data segments, wherein N is an integer less than or equal to M;
            determining a single relative memory address associated with an address specified by the host command;
            assembling a sub-request comprising the single relative memory address, the N data segments of the first data division, and a set of instructions, the set of instructions including instructions: to write the N data segments in N memory portions of the first memory device, to perform an XOR operation on one or more of the N data segments, and to write a resulting XOR value in a particular memory portion of the M memory portions of the first memory device; and
            transmitting the sub-request to every memory portion of the M memory portions of the first memory device.

2. The method of claim 1, wherein the set of instructions in the sub-request includes information to perform an XOR operation at a first memory portion of the M memory portions using at least one data segment in the sub-request and a predefined seed value stored in the first memory portion.

3. The method of claim 2, wherein the predefined seed value stored in the first memory portion is derived from the at least one data segment.

4. The method of claim 2, wherein the predefined seed value stored in the first memory portion is derived from the single relative memory address.

5. The method of claim 1, wherein the set of instructions includes an instruction for the particular memory portion of the M memory portions to generate an XOR of all N data segments and to store the resulting XOR value in the particular memory portion.

6. The method of claim 1, wherein the one or more XOR instructions includes an instruction for each memory portion of two or more of the M memory portions to generate an XOR of a particular pair of the N data segments and to store the resulting XOR value in the particular memory portion.

7. The method of claim 1, wherein the number of data segments, N, is equal to the number of memory portions, M, and the one or more XOR instructions includes an instruction for the particular memory portion to generate an XOR of a data segment corresponding to the particular memory portion, and to store the resulting XOR value in the particular memory portion.

8. The method of claim 1, wherein each data segment has a size equal to a non-integer multiple of the size of a page of data, and the sub-request further comprises memory portion markers positioned among the data segments.

9. A storage system, comprising:
    a storage device that includes a set of memory devices, each memory device comprising a plurality of memory portions; and
    a memory controller, having one or more processors and memory storing one or more programs to be executed by the one or more processors, configured to control operation of the storage system by:
    responding to receiving a host command to write data, wherein the host command includes a data packet comprising one or more data divisions and a backup request to backup at least a portion of the data packet, by:

assigning a first data division of the data packet to a first memory device having M memory portions, wherein M is an integer greater than one, and the first data division includes a sequence of N data segments, wherein N is an integer less than or equal to M;

determining a single relative memory address associated with an address specified by the host command;

assembling a sub-request comprising the single relative memory address, the N data segments of the first data division, and a set of instructions, the set of instructions including instructions: to write the N data segments in N memory portions of the first memory device, to perform an XOR operation on one or more of the N data segments, and to write a resulting XOR value in a particular memory portion of the M memory portions of the first memory device; and transmitting the sub-request to every memory portion of the M memory portions of the first memory device.

10. The storage system of claim 9, wherein the memory controller includes a sub-request formation module for assembling the sub-request and a location determination module for determining the single relative memory address.

11. The storage system of claim 9, wherein the set of instructions in the sub-request includes information to perform an XOR operation at a first memory portion of the M memory portions using at least one data segment in the sub-request and a predefined seed value stored in the first memory portion.

12. The storage system of claim 10, wherein the predefined seed value stored in the first memory portion is derived from the at least one data segment.

13. The storage system of claim 10, wherein the predefined seed value stored in the first memory portion is derived from the single relative memory address.

14. The storage system of claim 9, wherein the set of instructions includes an instruction for the particular memory portion of the M memory portions to generate an XOR of all N data segments and to store the resulting XOR value in the particular memory portion.

15. The storage system of claim 9, wherein the one or more XOR instructions includes an instruction for each memory portion of two or more of the M memory portions to generate an XOR of a particular pair of the N data segments and to store the resulting XOR value in the particular memory portion.

16. The storage system of claim 9, wherein the number of data segments, N, is equal to the number of memory portions, M, and the one or more XOR instructions includes an instruction for the particular memory portion to generate an XOR of a data segment corresponding to the particular memory portion, and to store the resulting XOR value in the particular memory portion.

17. The storage system of claim 9, wherein each data segment has a size equal to a non-integer multiple of the size of a page of data, and the sub-request further comprises memory portion markers positioned among the data segments.

18. A non-transitory computer readable storage medium storing one or more programs, the one or more programs comprising instructions, which, when executed by a memory controller with one or more processors, cause the memory controller to:

receive a host command to write data, wherein the host command includes a data packet comprising one or more data divisions and a backup request to backup at least a portion of the data packet;

in response to receiving the host command:
 assign a first data division of the data packet to a first memory device having M memory portions, wherein M is an integer greater than one, and the first data division includes a sequence of N data segments, wherein N is an integer less than or equal to M;
 determine a single relative memory address associated with an address specified by the host command;
 assemble a sub-request comprising the single relative memory address, the N data segments of the first data division, and a set of instructions, the set of instructions including instructions: to write the N data segments in N memory portions of the first memory device, to perform an XOR operation on one or more of the N data segments, and to write a resulting XOR value in a particular memory portion of the M memory portions of the first memory device; and
 transmit the sub-request to every memory portion of the M memory portions of the first memory device.

19. The non-transitory computer readable storage medium of claim 18, wherein the set of instructions in the sub-request includes information to perform an XOR operation at a first memory portion of the M memory portions using at least one data segment in the sub-request and a predefined seed value stored in the first memory portion.

20. The non-transitory computer readable storage medium of claim 18, wherein the set of instructions includes an instruction for the particular memory portion of the M memory portions to generate an XOR of all N data segments and to store the resulting XOR value in the particular memory portion.

* * * * *